United States Patent
Hayashi

(10) Patent No.: US 11,223,735 B2
(45) Date of Patent: Jan. 11, 2022

(54) INFORMATION PROCESSING APPARATUS, METHOD OF CONTROLLING THE SAME, AND NON-TRANSITORY STORAGE MEDIUM STORING PROGRAM EXECUTABLE BY THE INFORMATION PROCESSING APPARATUS

(71) Applicant: BROTHER KOGYO KABUSHIKI KAISHA, Nagoya (JP)

(72) Inventor: Seigo Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/205,141

(22) Filed: Mar. 18, 2021

(65) Prior Publication Data

US 2021/0306501 A1    Sep. 30, 2021

(30) Foreign Application Priority Data

Mar. 30, 2020   (JP) .............................. JP2020-060659

(51) Int. Cl.
    *H04N 1/00* (2006.01)
(52) U.S. Cl.
    CPC ..... *H04N 1/00901* (2013.01); *H04N 1/00904* (2013.01); *H04N 1/00907* (2013.01); *H04N 2201/0048* (2013.01)
(58) Field of Classification Search
    None
    See application file for complete search history.

(56) References Cited

U.S. PATENT DOCUMENTS

| | | | | |
|---|---|---|---|---|
| 2007/0260116 | A1* | 11/2007 | Shigemori | A61B 1/00036 600/117 |
| 2014/0198338 | A1* | 7/2014 | Onishi | H04N 1/00411 358/1.14 |
| 2015/0264208 | A1 | 9/2015 | Achiwa et al. | |
| 2018/0084127 | A1* | 3/2018 | Yamazaki | H02J 7/0068 |
| 2020/0236242 | A1* | 7/2020 | Kwak | H04N 1/00899 |

FOREIGN PATENT DOCUMENTS

JP    2015-176442 A    10/2015

* cited by examiner

*Primary Examiner* — Lennin R Rodriguezgonzalez
(74) *Attorney, Agent, or Firm* — Merchant & Gould P.C.

(57) ABSTRACT

An information processing apparatus, including an interface and a controller configured to: receive, from an external device, first change acceptable or non-acceptable information indicating whether changing of an amount of electric power to be supplied to the external device is allowable; supply, after the receiving the first change acceptable or non-acceptable information, the electric power to the external device; receive, during executing the supplying the electric power, second change acceptable or non-acceptable information indicating whether the changing of the power amount is allowable; determine, during executing the supplying the electric power, whether limiting of the power amount is necessary; and limit, based on the second change acceptable or non-acceptable information, the power amount when the controller determines to limit the power amount in the determining whether limiting of the power amount is necessary and the receiving the second change acceptable or non-acceptable information is executed.

15 Claims, 9 Drawing Sheets

FIG. 2

TYPE OF MESSAGES AND CONTENTS OF MESSAGES

| NO | TYPE OF MESSAGES | DIRECTION | CONTENTS |
|---|---|---|---|
| 1 | SUPPLY CAPABILITY (Capability) | PRINTER → EXTERNAL DEVICE | INFORMATION INDICATING COMBINATIONS OF SUPPLY VOLTAGE Vs AND SUPPLY CURRENT As SUPPLIABLE FROM PRINTER (POWER LIST) |
| 2 | SUPPLY REQUEST (Request) | EXTERNAL DEVICE → PRINTER | (1) INFORMATION INDICATING COMBINATION OF SUPPLY VOLTAGE Vs AND SUPPLY CURRENT As REQUESTED BY EXTERNAL DEVICE<br>(2) Mismatch FLAG<br>FLAG INDICATING PRESENCE OR ABSENCE OF MISMATCH WITH RESPECT TO SUPPLY CAPABILITY MESSAGE<br>(FLAG IS ON IN THE CASE OF MISMATCH AND OFF IN THE CASE OF MATCH)<br>(3) GiveBack ATTRIBUTE FLAG<br>FLAG INDICATING WHETHER POWER AMOUNT CHANGE IS ACCEPTABLE AFTER STARTING POWER SUPPLYING<br>(FLAG IS ON WHEN POWER AMOUNT CHANGE IS ACCEPTABLE AND OFF WHEN POWER AMOUNT CHANGE IS NOT ACCEPTABLE)<br>(4) MINIMUM OPERATING CURRENT VALUE<br>MINIMUM CURRENT VALUE REQUESTED WHEN POWER AMOUNT IS MINIMIZED (NOTIFIED ONLY WHEN GiveBack ATTRIBUTE FLAG IS ON) |
| 3 | SUPPLY ACCEPT (Accept) | PRINTER → EXTERNAL DEVICE | MESSAGE INDICATING THAT POWER SUPPLYING ACCORDING TO SUPPLY REQUEST MESSAGE IS EXECUTABLE |
| 4 | SUPPLY PREPARATION COMPLETION (PS_RDY) | PRINTER → EXTERNAL DEVICE | MESSAGE INDICATING THAT PREPARATION FOR STARTING POWER SUPPLYING ACCORDING TO SUPPLY REQUEST MESSAGE IS COMPLETED |
| 5 | SUPPLY REJECT (Reject) | PRINTER → EXTERNAL DEVICE | MESSAGE INDICATING THAT POWER SUPPLYING ACCORDING TO SUPPLY REQUEST MESSAGE IS NOT EXECUTABLE |
| 6 | SUPPLY MINIMIZATION REQUEST (GoToMin) | PRINTER → EXTERNAL DEVICE | MESSAGE NOTIFYING CHANGE REQUEST FOR MINIMIZING POWER AMOUNT |
| 7 | SUPPLY STOP REQUEST (HardReset) | EXTERNAL DEVICE → PRINTER | MESSAGE NOTIFYING STOP OF POWER SUPPLYING |

INFORMATION PROCESSING APPARATUS, METHOD OF CONTROLLING THE SAME, AND NON-TRANSITORY STORAGE MEDIUM STORING PROGRAM EXECUTABLE BY THE INFORMATION PROCESSING APPARATUS

CROSS REFERENCE TO RELATED APPLICATION

The present application claims priority to Japanese Patent Application No. 2020-060659, which was filed on Mar. 30, 2020, the disclosure of which is herein incorporated by reference in its entirety.

BACKGROUND

Technical Field

The following disclosure relates to an information processing apparatus configured to supply electric power to an external device, a method of controlling the information processing apparatus, and a non-transitory storage medium storing a program executable by the information processing apparatus.

Description of Related Art

Various information processing apparatuses configured to supply electric power to an external device via an interface have been conventionally proposed. For example, a known printing apparatus supplies, to an external device, electric power from a USB interface according to USB PD (USB Power Delivery) standard. When the printing apparatus receives a print instruction during supplying electric power to the external device, the printing apparatus performs printing based on the received print instruction after having reduced electric power to be supplied to the external device.

SUMMARY

When the printing apparatus described above detects a USB connection in which a USB cable is connected to a USB interface, the printing apparatus performs communication compliant with the USB PD standard and receives a power supply request notification. For the power supply request notification, a GiveBack attribute flag is set. The GiveBack attribute flag indicates whether, after the supply of the electric power has started, an amount of the electric power to be supplied is accepted to be changed during the supply of the electric power. For an external device in which the GiveBack attribute flag is ON, the printing apparatus changes, before starting printing, the amount of the electric power to be supplied. In the following description, "an amount of electric power to be supplied" will be referred to as "a power amount to be supplied", and "to supply electric power in an amount" will be referred to as "to supply a power amount".

The printing apparatus described above performs transmission/reception of the GiveBack attribute flag and determines whether changing the power amount to be supplied is acceptable at a timing when a new USB connection to the USB interface is detected. On one hand, a state of electric power (power state) of the external device may vary after the USB connection has been established or after the supply of the electric power has started. For example, a case is considered in which the external device initially accepts changing the power amount to be supplied thereto by GiveBack attribute flag at the time of the establishment of the USB connection, but thereafter an amount of electric power consumed by the external device may increase and the external device may suffer from a power shortage if the power amount to be supplied thereto is changed.

Accordingly, an aspect of the present disclosure is directed to an information processing apparatus capable of preventing an external device from suffering from a power shortage when the power amount to be supplied to the external device is changed, a method of controlling the information processing apparatus, and a non-transitory storage medium storing a program executable by the information processing apparatus.

In one aspect of the present disclosure, an information processing apparatus includes: an interface; and a controller, wherein the controller is configured to: receive, from an external device, first change acceptable or non-acceptable information indicating whether changing of a power amount to be supplied to the external device via the interface is acceptable, the power amount being an amount of electric power to be supplied to the external device; supply, after the receiving the first change acceptable or non-acceptable information from the external device, the electric power to the external device via the interface; receive, during executing the supplying the electric power to the external device via the interface, second change acceptable or non-acceptable information indicating whether the changing of the power amount to be supplied to the external device via the interface is acceptable; determine, during executing the supplying the electric power to the external device via the interface, whether limiting of the power amount to be supplied to the external device is necessary; and limit, based on the second change acceptable or non-acceptable information, the power amount to be supplied to the external device when the controller determines to limit the power amount to be supplied to the external device in the determining whether limiting of the power amount to be supplied to the external device is necessary and the receiving the second change acceptable or non-acceptable information is executed.

In another aspect of the present disclosure, an information processing apparatus includes: an interface; and a controller, wherein the controller is configured to: receive, from an external device, first change acceptable or non-acceptable information indicating whether changing of a power amount to be supplied to the external device via the interface is acceptable, the power amount being an amount of electric power to be supplied to the external device; supply, after the receiving the first change acceptable or non-acceptable information from the external device, the electric power to the external device via the interface; determine, during executing the supplying the electric power to the external device via the interface, whether limiting of the power amount to be supplied to the external device is necessary; receive second change acceptable or non-acceptable information indicating whether the changing of the power amount to be supplied to the external device via the interface is acceptable when the controller determines to limit the power amount to be supplied to the external device in the determining whether limiting of the power amount to be supplied to the external device is necessary; and limit the power amount to be supplied to the external device based on the second change acceptable or non-acceptable information received in the receiving the second change acceptable or non-acceptable information.

In still another aspect of the present disclosure, an information processing apparatus includes: an interface; and a controller, wherein the controller is configured to: supply electric power to an external device via the interface; determine, during executing the supplying the electric power to the external device via the interface, whether limiting of a power amount to be supplied to the external device is necessary, the power amount being an amount of the electric power to be supplied to the external device; transmit, to the external device, information indicating a limiting-start waiting time when the controller determines to limit the power amount to be supplied to the external device in the determining whether limiting of the power amount to be supplied to the external device is necessary, the limiting-start waiting time being a length of time before starting limiting the power amount to be supplied to the external device; and limit the power amount to be supplied to the external device based on a lapse of the limiting-start waiting time.

In yet another aspect of the present disclosure, a method of controlling an information processing apparatus including an interface and a controller, the method including: a power supplying step of supplying electric power to an external device via the interface; a power-amount-limiting necessity or unnecessity determination step of determining, during executing the power supplying step, whether limiting of a power amount to be supplied to the external device is necessary, the power amount being an amount of the electric power to be supplied to the external device; a transmission step of transmitting, to the external device, information indicating a limiting-start waiting time when the controller determines to limit the power amount to be supplied to the external device in the power-amount-limiting necessity or unnecessity determination step, the limiting-start waiting time being a length of time before starting limiting the power amount to be supplied to the external device; and a power-amount limiting step of limiting the power amount to be supplied to the external device based on a lapse of the limiting-start waiting time.

In further aspect of the present disclosure, a non-transitory storage medium storing a program executable by a computer of an information processing apparatus including an interface, wherein, when executed by the computer, the program causes the image forming apparatus to: receive, from an external device, first change acceptable or non-acceptable information indicating whether changing of a power amount to be supplied to the external device via the interface is acceptable, the power amount being an amount of electric power to be supplied to the external device; supply, after the receiving the first change acceptable or non-acceptable information from the external device, the electric power to the external device via the interface; determine, during executing the supplying the electric power to the external device via the interface, whether limiting of the power amount to be supplied to the external device is necessary; receive second change acceptable or non-acceptable information indicating whether the changing of the power amount to be supplied to the external device via the interface is acceptable when it is determined to limit the power amount to be supplied to the external device in the determining whether limiting of the power amount to be supplied to the external device is necessary; and limit the power amount to be supplied to the external device based on the second change acceptable or non-acceptable information received in the receiving the second change acceptable or non-acceptable information.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 2 is a table illustrating a type of messages and contents of the messages defined according to USB PD standard;

DETAILED DESCRIPTION OF THE EMBODIMENT

Figure 1:
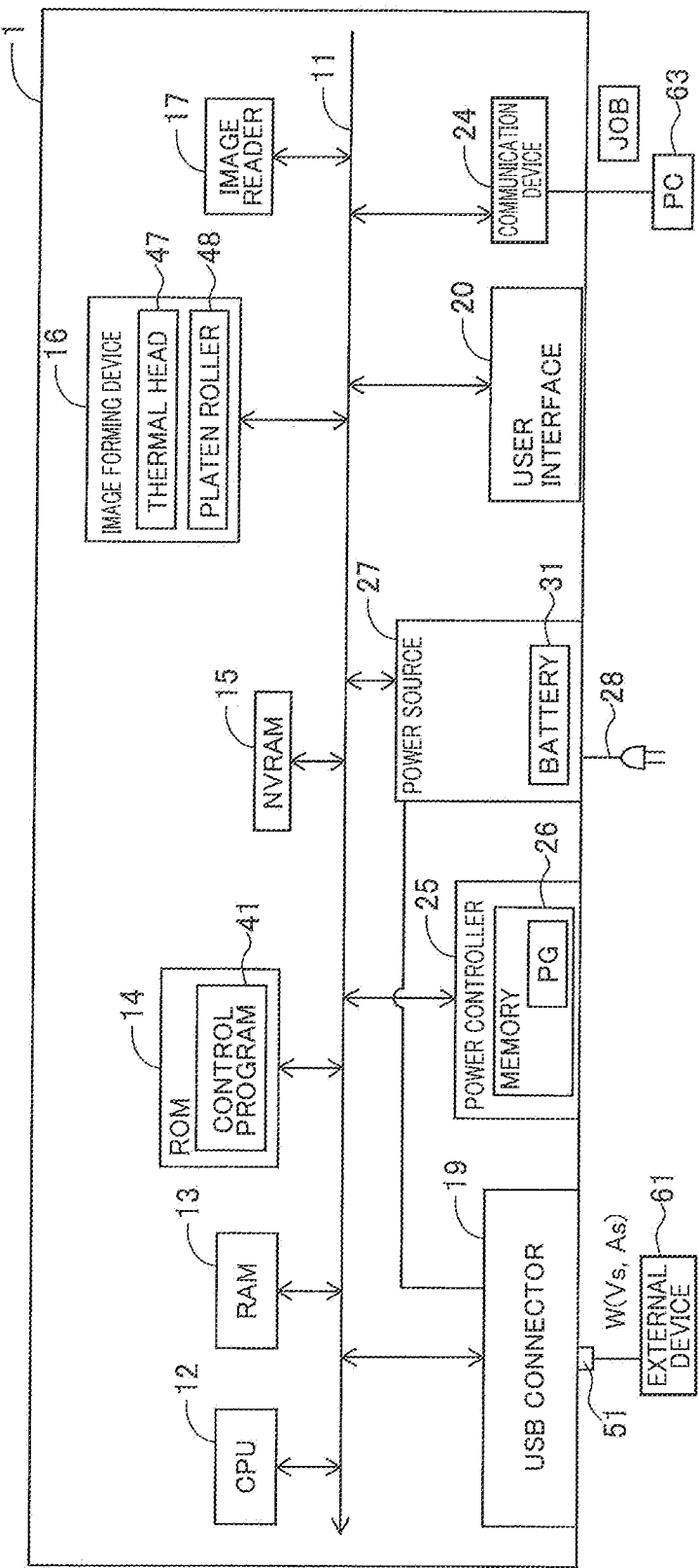
FIG. 1 is a block diagram illustrating an electrical configuration of a printer according to one embodiment.

Referring to FIG. 1, there will be hereinafter described a portable printer 1 as one example of an information processing apparatus according to one embodiment.

1. Configuration of Portable Printer

FIG. 1 illustrates an electric configuration of a portable printer 1 according to one embodiment. For example, the printer 1 is a portable printing apparatus that prints, on a suitable sheet (such as thermal paper), an image corresponding to image data of a print job received from a PC or a smartphone over wired communication or wireless communication. The printer 1 includes a CPU 12, a RAM 13, a ROM 14, an NVRAM 15, an image forming device (that may be also referred to as an image forming engine) 16, an image reader 17, a USB (Universal Serial Bus) connector 19, a user interface 20, a communication device 24, a power controller 25, and a power source 27. These devices such as the CPU 12 are connected to each other by a bus 11.

The ROM 14 is a nonvolatile memory such as a flash memory and stores various programs such as a control program 41. For example, the CPU 12 executes the control program 41 read out from the ROM 14 and activates the system of the printer 1. The data storage location indicated above is just one example. The control program 41 may be stored in the NVRAM 15, for example. The storage that stores the control program 41 may be a computer-readable storage medium. There may be employed, as the computer-readable storage medium, a recording medium such as a CD-ROM or a DVD-ROM, in addition to the above example.

The control program 41 is a firmware that performs overall control of the devices of the printer 1, for example. The CPU 12 executes the control program 41 to control the devices connected by the bus 11 while temporarily storing executed processing results in the RAM 13. In the following description, the CPU 12 that executes the control program 41 will be simply referred to as "the CPU 12" where appropriate. For example, the wording "the CPU 12" means, in some cases, "the CPU 12 that executes the control program 41". The NVRAM 15 is a nonvolatile memory and stores various sorts of setting information of the printer 1.

The image forming device 16 includes, for example, a line-type thermal head 47 and prints an image on a sheet according to a direct thermal method based on control by the CPU 12. The image forming device 16 conveys the sheet by rotating a platen roller 48 opposed to the thermal head 47. For example, when the sheet is inserted into an insertion opening of the printer 1 at the start of printing, the inserted sheet is guided to a position between the platen roller 48 and the thermal head 47 and is discharged through a discharge opening after completion of printing.

The structure of the image forming device 16 described above is one example. The image forming device 16 may include a toner cartridge, a photoconductive drum, a developer roller, and an exposure device and may be configured to perform printing according to an electrophotographic method. Alternatively, the image forming device 16 may include an inkjet head and an ink cartridge and may be configured to perform printing according to an inkjet printing method.

The image reader 17 includes a document support (not illustrated) and an image sensor such as a contact image sensor (CIS) or a charge-coupled device (CCD). The image reader 17 moves the CIS with respect to a document placed on the document support, reads the document to form image data, and stores the image data in the RAM 13.

The USB connector 19 is an interface that performs communication and transmission/reception of electric power according to the USB PD (USB Power Delivery) standard. The USB connector 19 includes a receptacle 51 as a connector. The USB connector 19 performs data communication and power transmission/reception with various external devices 61 connected to the receptacle 51. FIG. 1 illustrates one example in which one external device 61 is connected to one receptacle 51. Examples of the external device include various devices connectable according to the USB standard such as a smartphone, a personal computer, a notebook computer, a printer, an external hard disk, a USB memory, and a card reader. The USB connector 19 may include a plurality of receptacles 51.

The receptacle 51 is a connector compliant with the USB Type-C standard, for example. The receptacle 51 includes a plurality of signal lines for data communication and power transmission/reception. For example, the receptacle 51 includes, as the plurality of signal lines, a TX signal line, an RX signal line, a D signal line, a Vbus signal line, a CC signal line, and a ground signal line in USB Type-C standard connector. It is noted that the signal line may be referred to as a pin. The receptacle 51 performs data communication using any of the TX signal line, the RX signal line, and the D signal line. The D signal line is, for example, a Data signal line and refers to D+/D−. The receptacle 51 supplies and receives electric power using the Vbus signal line.

The CC signal line is a signal line used for determining a power role, for example. The CC signal line includes a CC1 signal line and a CC2 signal line for two sides (front and back) of a plug connected to the receptacle 51. The CC signal line is also used as a signal line for communication relating to apparatus management such as an alert message. The printer 1 according to the present embodiment uses the CC signal line for transmission/reception of messages illustrated in FIG. 2 as later explained. The communication channel used for the message transmission/reception is not limited to the CC signal line but may be other signal lines such as the D signal line or may be a combination of a plurality of signal lines. The receptacle 51 has a dual role power (DRP) function of switching between a power source that is a power role of supplying electric power and a power sink that is a power role of receiving electric power.

The power controller 25 controls power transmission/reception and data transmission/reception via the USB connector 19. The power controller 25 determines the power role based on the connection state of the CC signal line (such as the potential of the CC signal line) when the external device 61 is connected to the receptacle 51, and executes a negotiation for power transmission/reception. Here, the negotiation is a processing for setting the power source or the power sink, for setting an amount of electric power to be transmitted and received, etc.

The power controller 25 executes a negotiation for setting an amount W of electric power to be supplied via the Vbus signal line with respect to the receptacle 51 functioning as the power source. In the following explanation, "an amount W of electric power to be supplied" will be referred to as "a power amount W to be supplied". The power controller 25 sends a power list of the power amount W to the external device 61, based on control by the CPU 12. Here, the power list is information indicating combinations of a voltage value of a supply voltage Vs and a current value of a supply current As that are suppliable by the printer 1 as the power source. The power list may be referred to as a profile. The combinations of the voltage value and the current value may be referred to as PDO (Power Data Object). For example, in the power transmission/reception via the USB connector 19 according to the present embodiment, the electric power can be supplied from the power source to the power sink in a power amount range of 10 W (5V, 2 A) to 100 W (20V, 5 A). The power list is information indicating the combinations (PDO) of the voltage value and the current value suppliable by the printer 1 functioning as the power source within the above power amount range.

When causing the receptacle 51 to function as the power sink, the power controller 25 executes a negotiation as to the reception of the electric power via the receptacle 51. For example, the power controller 25 requests a combination of the voltage value and the current value desired to receive in the power list received from the external device 61 functioning as the power source, based on control by the CPU 12. When the negotiation succeeds, the receptacle 51 receives the desired electric power from the external device 61.

As illustrated in FIG. 1, the power controller 25 includes a memory 26. The memory 26 stores a program PG, for example. The power controller 25 includes a processing circuit such as a CPU. The power controller 25 executes the program PG in the processing circuit to thereby execute control of the power source 27, for example. The memory 26 is constituted by a combination of a RAM, a ROM, a flash memory, and the like.

The power source 27 functions as a power source for the devices in the printer 1 and supplies electric power to the devices. The power source 27 includes a power cord 28 and a battery 31. The power source 27 generates a direct voltage of a desired voltage value from an alternating voltage received from an AC power source via the power cord 28 and supplies the generated direct voltage to the devices in the printer 1. The power source 27 converts a direct voltage supplied from the battery 31 and generates a direct voltage to be supplied to the devices in the printer 1. Thus, even when the printer 1 is not connected to the AC power source, the printer 1 can be driven by the battery 31. The battery 31 is configured to be charged with electric power supplied via the power cord 28 or electric power received from the external device 61 via the USB connector 19.

The power source 27 is connected to the USB connector 19. The power source 27 generates, from the alternating voltage received via the power cord 28 or the direct voltage supplied from the battery 31, electric power in an amount W (supply voltage Vs, supply current As) to be supplied from the USB connector 19 to the external device 61. In the following explanation, "electric power in an amount W to be supplied" will be referred to as "a power amount W to be supplied".

The user interface 20 is a touch panel, for example, and includes a liquid crystal panel, a light source such as an LED that emits light from the back side of the liquid crystal panel, and a contact sensing film bonded to the surface of the liquid crystal panel. The user interface 20 receives an operation on the printer 1 and outputs, to the CPU 12, a signal corresponding to the operation input. The user interface 20 displays information relating to the printer 1. The user interface 20 changes the display contents of the liquid crystal panel based on control by the CPU 12. The user interface 20 may include operation buttons such as hardware keys. The user interface 20 need not necessarily have the structure, such as the touch panel, in which the display and the operation portion are integral, but may include the display and the operation portion separately.

The communication device 24 is a communication device capable of performing wired communication and wireless communication. As illustrated in FIG. 1, the communication device 24 is wiredly connected to a PC 63 via a LAN cable. The CPU 12 controls the communication device 24 and receives an image forming job JOB from the PC 63. The image forming job JOB includes a print job instructing the image forming device 16 to perform printing based on image data and a scan job instructing the image reader 17 to perform scanning. The printer 1 receives the image forming job JOB from the PC 63 over the wired communication and executes image formation based on the received image forming job JOB. The communication for receiving the image forming job JOB may be wireless communication such as Bluetooth (registered trademark). The device that transmits the image forming job JOB is not limited to the PC 63, but may be a smartphone or a tablet computer. The printer 1 is capable of receiving the image forming job JOB by data communication via the USB connector 19. The CPU 12 receives the image forming job JOB based on the operation input to the user interface 20 and performs copying and scanning.

2. Mode

The present printer 1 has a function of shifting to the power saving mode for reducing power consumption. Here, the power saving mode is a standby mode in which the printer 1 is placed in a standby state to reduce power consumption, for example. The printer 1 shifts to the standby mode when the printer 1 detects that a request for executing a next image forming job JOB (such as a print job or a scan job), a user's input operation through the touch panel of the user interface 20 or the like is not made for a predetermined length of time after completion of the printing operation or the scanning operation, for example. When the printer 1 shifts to the standby mode, the printer 1, for example, stops energization of the thermal head of the image forming device 16 and the image sensor of the image reader 17 and turns off a backlight of the display panel of the user interface 20 to place the display panel in a non-displaying state, so as to reduce power consumption.

The power saving mode in the present disclosure is not limited to the standby mode described above. For example, the printer 1 may include a low power consumption mode (e.g., a sleep mode) in which power consumption is reduced more than in the standby mode. For example, when a request for executing the image forming job JOB or a user's input operation, etc., is not made for a predetermined length of time after shifting to the standby mode, the printer 1 shifts to the low power consumption mode for achieving further power saving. In the low power consumption mode, the printer 1 may activate only a part of the power source 27 to stop supplying electric power to the image forming device 16 and the image reader 17, so as to achieve power saving.

3. Messages in USB PD Communication

FIG. 2 is a table indicating a type of messages defined according to the USB PD standard and contents of the messages. Among the messages used in the USB PD communication, messages used in control of transmission/reception of electric power are indicated in FIG. 2. In the table of FIG. 2, there are indicated, in order from the left, NO (number), the type of messages, a communication direction of message transmission/reception, and the contents of the messages. The communication direction indicated in FIG. 2 is a direction in a case where the printer 1 functions as the power source for supplying the electric power.

A supply capability (Capability) message of NO. 1 is a message transmitted from the printer 1 to the external device 61 and contains information indicating the combinations of the supply voltage Vs and the supply current As of the power amount W suppliable from the printer 1, namely, indicating the power list.

A supply request (Request) message of NO. 2 is a message transmitted from the external device 61 to the printer 1. The supply request message contains information, i.e., (1) in the contents, indicating a combination of the supply voltage Vs and the supply current As requested by the external device 61 among the combinations indicated by the power capability message. The supply request message contains a Mismatch flag, i.e., (2) in the contents, indicating capability mismatch. The Mismatch flag is a flag indicating the presence or absence of capability mismatch with respect to the supply capability message. For example, the Mismatch flag is a flag indicating whether i) there is a combination of the supply voltage Vs and the supply current As requested or requestable by the external device 61 among the combinations indicated by the supply capability message and the external device 61 accordingly requests electric power or ii) there is no combinations desired by the external device 61 and the external device 61 does not request electric power. For the Mismatch flag, there are set, for example, a bit value indicating ON in the case of capability mismatch (not requesting) and a bit value indicating OFF in the case of capability match (requesting).

The supply request message contains a GiveBack attribute flag indicating whether changing the power amount W to be supplied is acceptable or not, i.e., (3) in the contents. For example, the GiveBack attribute flag is a flag indicating whether the external device 61 as the power sink accepts changing the power amount W after power supplying has been started. For the GiveBack attribute flag, there are set, for example, a bit value indicating ON when the external device 61 accepts changing the power amount W and a bit value indicating OFF when the external device 61 does not accept changing the power amount W.

In some cases, the supply request message contains a minimum operating current value, i.e., (4) in the contents. The minimum operating current value is a minimum current value requested when the power amount W is changed so as to be minimized. In a case where the power amount W is minimized, the external device 61 sets the minimum operating current value corresponding to the power amount required at a minimum, for example. In a case where the printer 1 receives the GiveBack attribute flag set at ON and changes the power amount W after having started power supplying, the printer 1, for example, lowers the electric current to be supplied down to the supply current As satisfying or corresponding to the minimum operating current value and reduces the power amount W, so as to limit the power amount W. Based on the minimum operating current value and the combinations of the supply voltage Vs and the supply current As that are suppliable and that are indicated by the power list, the printer 1 determines the power amount W (supply voltage Vs, supply current As) to be supplied during limiting the power amount W. Thus, the minimum operating current value is notified to the printer 1 from the external device 61 only when the GiveBack attribute flag is set at ON. It is noted that the limiting of the power amount in the present disclosure is a concept including not only merely reducing the power amount but also reducing the power amount to zero.

The minimum operating current value is one example of first minimum-power-amount information and second minimum-power-amount information. The first minimum-power-amount information and the second minimum-power-amount information are not limited to a current value. For example, the first minimum-power-amount information and the second minimum-power-amount information may be a voltage value or may be information defined by a combination of a current value and a voltage value. Further, a minimum power amount refers to a power amount smaller than that required by a normal supply request message, for example. Further, the minimum power amount may be the smallest power amount (i.e., a combination of the supply voltage Vs and the supply current As that defines the smallest power amount) among a plurality of power amounts W (i.e., a plurality of combinations of the supply voltage Vs and the supply current As) requested by the normal supply request message.

A supply accept (Accept) message of NO. 3 is a message transmitted from the printer 1 to the external device 61. The supply accept message indicates that the power supplying according to the supply request message is executable. A supply preparation completion (PS_RDY) message of NO. 4 is a message transmitted form the printer 1 to the external device 61. The supply preparation completion message indicates that preparation of the power supplying according to the supply request message is completed.

A supply reject (Reject) message of NO. 5 is a message transmitted from the printer 1 to the external device 61. The supply reject message indicates that the power supplying according to the supply request message is not executable. A supply minimization request (GoToMin) message of NO. 6 is a message transmitted from the printer 1 to the external device 61. The supply minimization request message is a message notifying a request to change the power amount W for minimization according to the GiveBack attribute flag and the minimum operating current value of the supply request message. A supply stop request (HardReset) message of NO. 7 is a message transmitted from the external device 61 to the printer 1. The supply stop request message is a message notifying stop of the power supplying.

4. Supply-Power Control Processing

Referring next to FIGS. 3-11, there will be explained a supply-power control processing executed by the printer 1 according to the present embodiment. When the printer 1 is powered on, the CPU 12 executes the control program 41 to start up the system of the printer 1 and then executes the supply-power control processing illustrated in FIGS. 3-11 in every predetermined period. By executing the supply-power control processing, the CPU 12 performs communication with the external device 61 while supplying electric power thereto, updates information on the GiveBack attribute flag and the minimum operating current value, and limits the power amount W based on the updated information. In the following explanation, there will be explained a case where the printer 1 functions as the power source to supply the electric power to the external device 61.

The condition for starting the supply-power control processing illustrated in FIGS. 3-11 is not limited to the startup of the system. For example, the CPU 12 may execute the supply-power control processing when the CPU 12 detects a change of a state of the apparatus determined at S11 that will be later explained. (The state of the apparatus will be hereinafter referred to as "apparatus state" where appropriate.) In this case, the CPU 12 executes, as the supply-power control processing, processings at and after S13 without executing S11. Further, the CPU 12 may execute the supply-power control processing when the CPU 12 detects a new USB connection to the receptacle 51. In this case, the CPU 12 may execute, as the supply-power control processing, S13, S15, and S19 in this order without executing S11, S17, and S18. Flow charts in the present specification basically indicate processings by the CPU 12 according to instructions described in the program. Accordingly, processings such as "determine", "detect", "transmit" in the following explanation indicate the processings by the CPU 12. The processings by the CPU 12 also include hardware control. The supply-power control processing illustrated in FIGS. 3-11 may be executed by a device other than the CPU 12. For example, the power controller 25 may execute the supply-power control processing illustrated in FIGS. 3-11 by executing the program PG.

Figure 3:
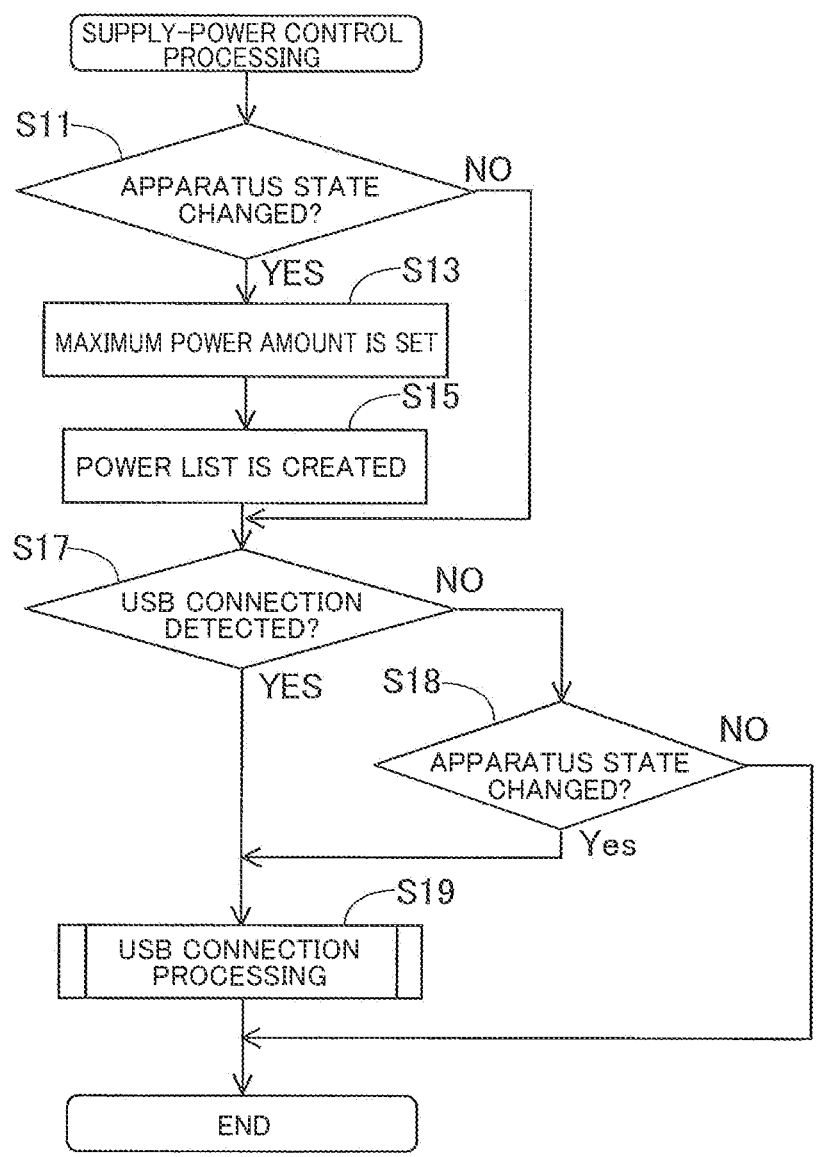
FIG. 3 is a flowchart indicating a supply-power control processing.

At Step 11 in FIG. 3, the CPU 12 determines whether the apparatus state has changed. Hereinafter, "Step" will be simply referred to as "S". Here, the change of the apparatus state refers to a change of the state of the printer 1 in which a maximum power amount is changed, for example. The maximum power amount is a maximum value of the power amount W to be supplied from the printer 1 to the external device 61. The amount of electric power consumed by the printer 1 differs between a normal state in which the printer 1 receives a printing or scanning instruction and the standby mode described above. Due to the difference, a surplus power amount changes, and the maximum power amount suppliable to the external device 61 accordingly changes.

When the CPU 12 detects the change of the apparatus state (S11: YES) in which the maximum power amount described above is changed, such as shifting from the standby mode to the normal state, the CPU 12 executes S13. When the CPU 12 does not detect the change of the apparatus state (S11: NO), the CPU 12 executes S17. At S13, the CPU 12 sets the maximum power amount. For example, the NVRAM 15 stores amounts of electric power to be consumed in respective states of the printer such as the normal state and the standby mode. The amount of electric power to be consumed will be hereinafter referred to as "power consumption amount" where appropriate. For example, the CPU 12 calculates and sets the maximum power amount in the present situation by subtracting the power consumption amount from the power source capacity of the power source 27, the remaining amount in the battery 31 or the like. The maximum power amount may be set otherwise. For example, the NVRAM 15 may store data base in which the apparatus state, the power source capacity of the power source 27, and the maximum power amount are associated with one another. The CPU 12 may retrieve the maximum power amount from the data base based on the apparatus state and the power source capacity of the power source 27, so as to set the maximum power amount.

After having executed S13, the CPU 12 executes S15. At S15, the CPU 12 creates a power list. For example, the CPU 12 sets combinations of the supply voltage Vs and the supply current As that are feasible within a range not exceeding the maximum power amount set at S13, and creates the power list including the set combinations. Thus, the CPU 12 creates the power list that represents suppliable power amounts within the range not exceeding the maximum power amount in accordance with the apparatus state.

After having executed S15, the CPU 12 executes S17. At S17, the CPU 12 determines whether a USB connection has been detected (S17). For example, the CPU 12 determines whether a new connection to the USB connector 19 has been detected. When the new connection has been detected (S17: YES), the CPU 12 executes a USB connection processing at S19. When the new connection has not been detected (S17: NO), the CPU 12 executes S18. The CPU 12 makes an affirmative determination at S17 (S17: YES) when the CPU 12 detects that the printer 1 performs communication with the external device 61 after the startup of the system as a result of power-on of the printer 1 in a state in which the external device 61 is connected to the USB connector 19. Alternatively, the CPU 12 makes an affirmative determination at S17 when the CPU 12 detects that the external device 61 is connected to the USB connector 19 after the startup of the system or when the external device 61 connected to the USB connector 19 is changed. Thus, the CPU 12 can execute S19 in a case where USB communication with the external device 61 is newly established for data transmission/reception. By executing S19, the CPU 12 can execute a negotiation with the external device 61 and can set the power amount W, as later explained. The CPU 12 makes a negative determination (S17: NO) in a case where, after executing the processing at S19 as a result of once having made an affirmative determination at S17, the CPU 12 again executes S17 while keeping establishing the USB connection with the external device 61. Thus, in a case where no change arises with respect to the connection with the external device 61 after once having established the communication, it is possible to omit execution of S19 with respect to the same external device 61. The CPU 12 may make an affirmative determination in a case where, after executing the processing at S19 as a result of once having made an affirmative determination at S17, the CPU 12 again executes S17 while keeping establishing the USB connection with the external device 61. In this case, the previously executed processings at and after S19 may be stopped. As later explained, the CPU 12 continues to execute the supply-power control processing with respect to the external device 61 to which the electric power is being currently supplied, by executing a first update processing of FIG. 6. The CPU 12 ends the supply-power control processing when the CPU 12 stops supplying the electric power such as when the Mismatch flag is ON. In this case, the CPU 12 may newly establish the USB connection with the external device 61 and may start the supply-power control processing illustrated in FIGS. 3-11.

At S18, the CPU 12 determines whether the apparatus state has changed. As explained above, when the apparatus state is changed, the maximum power amount is changed and the power list is accordingly changed. Thus, the CPU 12 executes S19 when the apparatus state has changed (S18: YES). In this case, if the CPU 12 is executing the first update processing (that will be later explained) with respect to the external device 61, the CPU 12 may end the processing. Thus, when the apparatus state of the printer 1 is changed even if no change arises with respect to the USB connection with the external device 61 (S17: NO), the CPU 12 executes S19 to execute changing the power amount W, for example. When the apparatus state is not changed (S18: NO), the CPU 12 ends the supply-power control processing.

Figure 4:
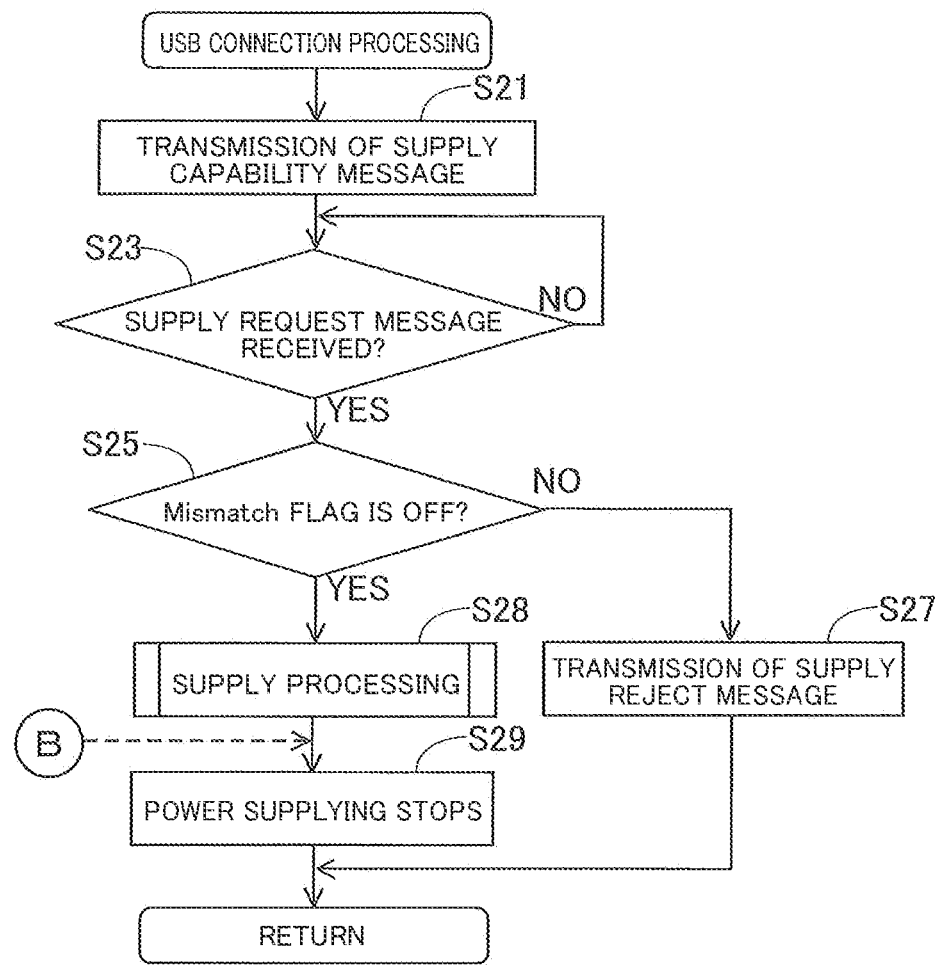
FIG. 4 is a flowchart indicating a USB connection processing.

FIG. 4 illustrates details of the USB connection processing at S19 in FIG. 3. As illustrated in FIG. 4, when the CPU 12 starts the USB connection processing, the CPU 12 transmits the supply capability message (FIG. 2) to the external device 61 connected to the USB connector 19 (S21). The CPU 12 transmits, to the external device 61, the supply capability message containing the information on the power list created at S15.

When the CPU 12 executes S21, the CPU 12 then determines whether the supply request message is received from the external device 61 (S23). The CPU 12 repeatedly executes the determination processing of S23 until the supply request message is received (S23: NO). When the supply request message is received from the external device 61 (S23: YES), the CPU 12 determines whether the Mismatch flag of the received supply request message is OFF (S25).

In a case where the Mismatch flag is ON, this means that the combination of the supply voltage Vs and the supply current As desired to be requested by the external device 61 is not present in the power list presented by the printer 1. Thus, when the Mismatch flag is ON (S25: NO), the CPU 12 transmits the supply reject message to the external device 61 and notifies the external device 61 that the electric power cannot be supplied (S27). The CPU 12 ends the supply-power control processing. In this case, the power supplying does not start.

On the other hand, when the Mismatch flag is OFF (S25: YES), the CPU 12 executes a supply processing (S28). When the CPU 12 ends the supply processing of S28, the CPU 12 controls the power source 27 to stop supplying the electric power from the USB connector 19 to the external device 61 (S29). The CPU 12 ends the supply-power control processing.

There will be explained two kinds of processing as the supply processing of S28 in FIG. 4 in the present embodiment. In the following explanation, the two kinds of processing will be respectively referred to as a first supply processing and a second supply processing. The first supply processing is a processing of updating information on the GiveBack attribute flag and the minimum operating current value while executing supplying the electric power. The second supply processing is a processing of limiting the power amount W in response to reception of the image forming job JOB in parallel with updating the information on the GiveBack attribute flag, etc., while executing supplying the electric power. For example, there are prepared, for the printer 1, two modes, namely, a mode in which the first supply processing is executed and a mode in which the second supply processing is executed. The two modes are switchable based on an operation input to the user interface 20. The printer 1 may be configured to execute only one of the first supply processing and the second supply processing.

5. First Supply Processing

Figure 5:
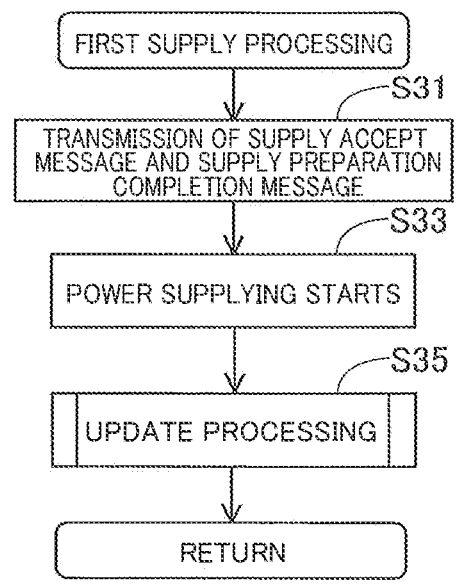
FIG. 5 is a flowchart indicating a first supply processing.

In the following explanation, the first supply processing will be initially explained, and the second supply processing will be subsequently explained. FIG. 5 indicates details of the first supply processing. When the CPU 12 starts the first supply processing, the CPU 12 transmits the supply accept message to the external device 61 and notifies the external device 61 that it is possible to supply the power amount W settled by the combination of the supply voltage Vs and the supply current As contained in the supply request message received at S23 of FIG. 4, namely, it is possible to supply the power amount W requested by the external device 61 (S31). The CPU 12 controls the power source 27 and executes preparation for generating and supplying the supply voltage Vs and the supply current As requested by the external device 61. When the preparation for supplying the power amount W is completed, the CPU 12 transmits the supply preparation completion message to the external device 61 (S31).

When the CPU 12 executes S31, the CPU 12 then starts supplying the electric power in the power amount W via the Vbus signal line (S33) and executes the update processing (S35). When the update processing is completed, the CPU 12 ends the first supply processing illustrated in FIG. 5.

There will be explained three kinds of processing as the update processing in the present embodiment. In the following explanation, the three kinds of processing will be respectively referred to as a first update processing, a second update processing, and a third update processing. The printer 1 may be configured to execute only one of the first through third update processings or may be configured to switchably execute the first through third update processings.

6. First Update Processing

Figure 6:
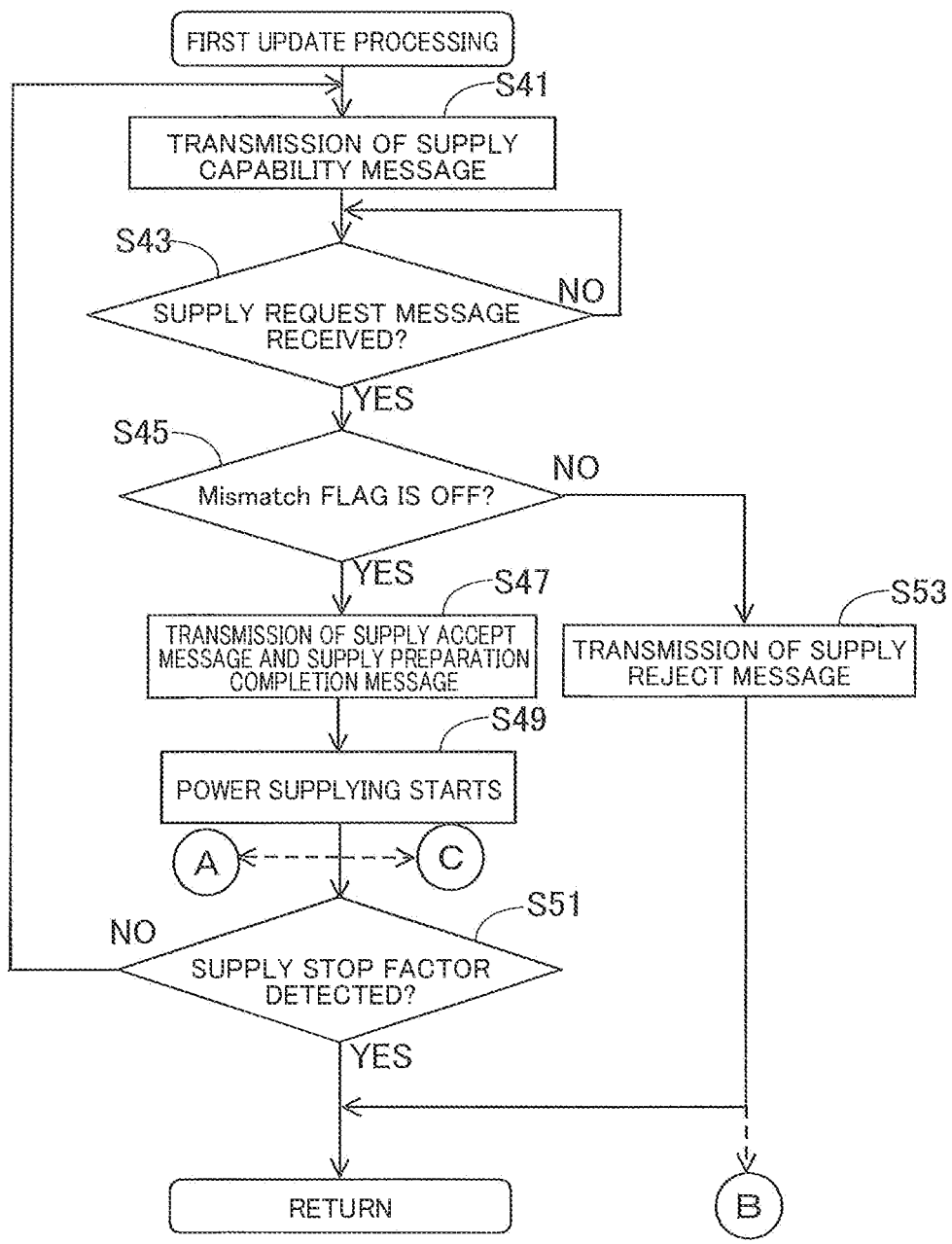
FIG. 6 is a flowchart indicating a first update processing.

FIG. 6 indicates details of the first update processing. In the following explanation, details similar to those in FIGS. 3-5 are not explained. As illustrated in FIG. 6, when the CPU 12 starts the first update processing, the CPU 12 transmits the supply capability message to the external device 61 (S41). After having executed S41, the CPU 12 determines whether the supply request message has been received from the external device 61 (S43). When the supply request message has been received (S43: YES), the CPU 12 executes S45.

It is noted that the power state of the external device 61 may change after the USB connection has been established or after the electric power has started to be supplied. For example, the external device 61 accepts changing the power amount W at the beginning of the establishment of the USB connection by setting the GiveBack attribute flag to ON and notifying it to the printer 1 at S23. However, when the power consumption amount increases thereafter, the external device 61 may suffer from a power shortage if the power amount W is limited. On the contrary, though the external device 61 once rejects changing the power amount W by setting the GiveBack attribute flag to OFF, the surplus power may increase thereafter and the power state of the external device may change to a state in which changing the power amount W is acceptable.

In view of the above, the CPU 12 of the present embodiment executes S41 and S43 so as to transmit the supply capability message and receive the supply request message after having started supplying the electric power to the external device 61, and obtains, from the external device 61, the information on the GiveBack attribute flag and the minimum operating current value, whereby the CPU 12 updates the information during supplying the electric power. In other words, even during the power supplying, the CPU 12 can give the external device 61 an opportunity to update the information on the GiveBack attribute flag, etc. With this configuration, the external device 61 can update the information on the GiveBack attribute flag and the minimum operating current value in accordance with the power state thereof (such as the power consumption amount and the surplus power).

At S45, the CPU 12 determines whether the Mismatch flag is OFF. When the Mismatch flag is OFF (S45: YES), the CPU 12 transmits the supply accept message and the supply preparation completion message to the external device 61 (S47) and starts supplying the electric power (S49), as executed at S31, S33 in FIG. 5. In a case where no change arises in the supply voltage Vs and the supply current As requested by the external device 61, the CPU 12 may execute a processing for maintaining the power amount W in the present situation without executing the processings at S47 and S49.

After having executed S49, the CPU 12 determines whether any supply stop factor has been detected (S51). The supply stop factor is a factor responsible for stopping supplying the electric power. The CPU 12 makes an affirmative determination at S51 (S51: YES) when the CPU 12 receives the supply stop request message (FIG. 2) from the external device 61. The CPU 12 makes an affirmative determination at S51 when the CPU 12 detects that the connection with the external device 61 via the USB connector 19 is cut. When the CPU 12 makes an affirmative determination at S51, the CPU 12 ends the processing illustrated in FIG. 6. In this case, the CPU 12 stops supplying the electric power at S29 in FIG. 4 and ends the supply-power control processing. With this configuration, the power supplying can be stopped when the external device 61 makes a request to stop the power supplying or when a malfunction occurs in the USB connection.

On the other hand, when the supply stop factor has not been detected (S51: NO), the CPU 12 again executes the processings at and after S41. Thus, the information on the GiveBack attribute flag and the minimum operating current value can be updated during supplying the electric power. Updating the information on the GiveBack attribute flag and the minimum operating current value will be hereinafter referred to as "information updating" where appropriate. There is a possibility that the printer 1 limits the power amount W during supplying the electric power due to various factors. The printer 1 needs to limit the power amount W in a case where the electric power cannot be received through the power cord 28 due to an occurrence of a power failure, for example. Further, it is needed to limit the power amount W in a case where the power consumption amount temporarily increases by performing a calibration operation for correcting an image quality, a cooling-down operation for releasing heat in the printer 1, or the like.

When limiting the power amount W in the situation described above, the limiting of the power amount W can be executed in accordance with the latest state of the external device 61 by updating, in advance, the information on the GiveBack attribute flag, etc. For example, it is possible to limit the power amount W if the external device 61 is in a state in which changing the power amount W is acceptable when the limiting of the power amount W is executed. Further, it is possible to limit the power amount W to a level corresponding to the minimum operating current value requested by the external device 61 when the limiting of the power amount W is executed. When the CPU 12 makes a negative determination at S51 (S51: NO), the CPU 12 may execute the processing at S41 after waiting for a predetermined length of time. This predetermined length of time may be set appropriately as a cycle in which the CPU 12 inquires of the external device 61 the information updating.

In a case where a need to limit the power amount W arises before executing the update processing at S35 in FIG. 5, the CPU 12 may execute the limiting of the power amount W based on the information on the GiveBack attribute flag and the minimum operating current value (as one example of a first change acceptable or non-acceptable information in the present disclosure). In a case where the calibration operation for correcting the image quality is performed before executing S35, for example, the CPU 12 may execute the limiting of the power amount W based on the information of the supply request message received at S23.

When the Mismatch flag is ON at S45 (S45: NO), the CPU 12 transmits the supply reject message to the external device 61 (S53) and ends the processing illustrated in FIG. 6. With this configuration, the power supplying can be stopped when the external device 61 requests the power amount W that the printer 1 cannot supply, i.e., the power amount W not present in the power list, such as when the external device 61 requests, as a result of the information updating, the power amount W larger than that at the time of starting supplying the electric power.

7. Second Update Processing

The second update processing will be explained. In the first update processing explained above, when the power supplying starts (S33), the supply capability message defined according to the USB PD standard is transmitted and the information is updated. In the second update processing, it is determined whether to execute the first update processing to transmit the supply capability message.

Figure 7:
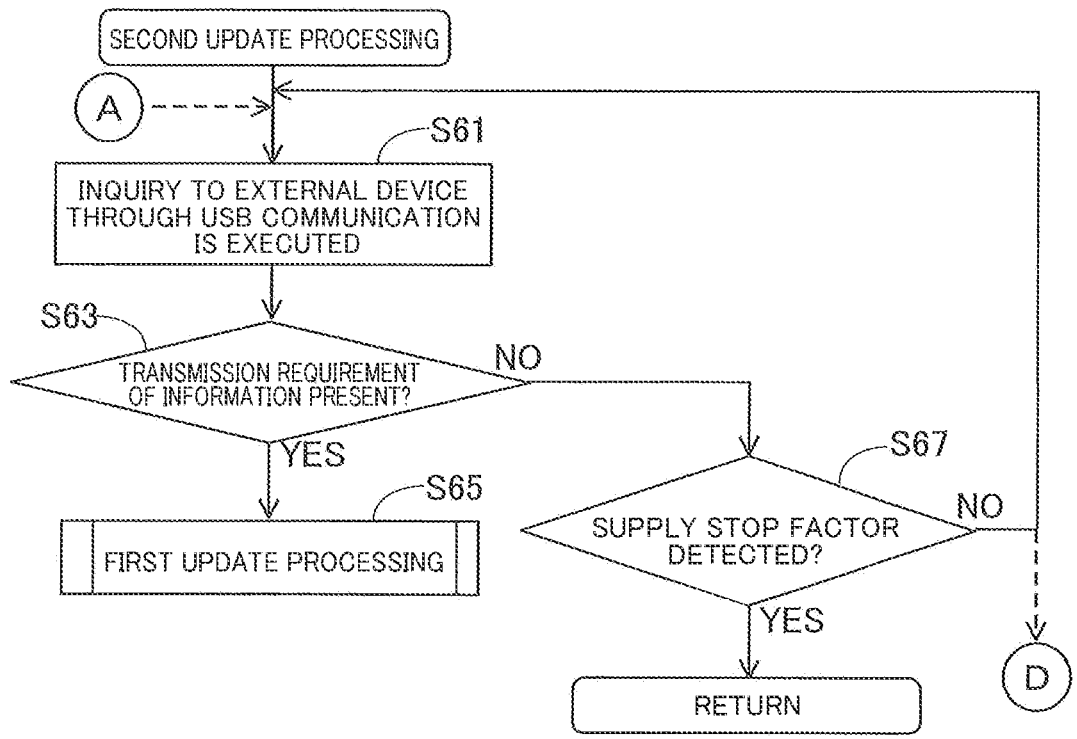
FIG. 7 is a flowchart indicating a second update processing.

FIG. 7 indicates details of the second update processing. As illustrated in FIG. 7, when the CPU 12 executes S35 in FIG. 5 to start the second update processing, the CPU 12 performs data transmission/reception through the USB communication with the external device 61, so as to inquire of the external device 61 whether the external device 61 requires transmission of the information on the GiveBack attribute flag and the minimum operating current value, namely, whether the external device 61 requests updating (S61). In the processing at S61, the CPU 12 inquires about the transmission requirement of the external device 61 not through the communication according to the USB PD standard utilizing the CC signal line or the like but through the USB communication utilizing the D signal line (D+/D− signal line). The communication protocol such as the data format of the messages according to the USB communication and the transmission/reception procedure of the messages is not limited to a particular one. For example, there may be utilized a communication protocol specified by a vendor of the printer 1 or the external device 61. The communication to inquire the transmission requirement is not limited to the USB communication, but other communication methods (such as communications other than the USB PD communication and the USB connection) may be utilized.

When the CPU 12 determines that the external device 61 requires to transmit the information (S63: YES) based on a result obtained at S61, the CPU 12 executes the first update processing illustrated in FIG. 6 (S65). In a case where the CPU 12 executes the first update processing at S65 in FIG. 7, for example, namely, in a case where the first update processing is called up from the second update processing, the CPU 12 executes S61 after having executed S49, without executing S51 in FIG. 6. (See dashed arrows and "A" in FIGS. 6 and 7.) With this configuration, the CPU 12 makes the inquiry at S61 in FIG. 7 and checks the result of the inquiry at S63 in FIG. 7. When the transmission requirement is present (S63: YES), the CPU 12 executes the first update processing only once, namely, the CPU 12 executes S41-S49 only once. In a case where the CPU 12 executes S53 in FIG. 6, i.e., in the case of mismatching, the CPU 12 may end the second update processing, namely, the CPU 12 may end S35 and S28, and may execute S29. It is noted that the CPU 12 may execute, at S65 of the second update processing, the first update processing whose details are the same as those of FIG. 6. In this case, the CPU 12 inquires about the presence or absence of the transmission requirement only once before executing the first update processing.

Thus, in a case where the CPU 12 executes the second update processing, the CPU 12 inquires whether the external device 61 is requiring the updating of the information on the GiveBack attribute flag or the like through data communication compliant with the USB standard and suitably executes the first update processing based on the result of the inquiry. By thus inquiring about the presence or absence of the transmission requirement through the USB communication beforehand, it is possible to decrease the number of times of transmission/reception of data such as the supply capability message through the USB PD communication when the first update processing is executed.

When the CPU 12 makes a negative determination at S63 (S63: NO), the CPU 12 determines whether the supply stop factor has been detected (S67), as at S51 in FIG. 6. When the supply stop factor has not been detected (S67: NO), the CPU 12 again executes the processings at and after S61. With this configuration, the CPU 12 inquiries about the presence or absence of the transmission requirement during supplying the electric power and updates the information only when the transmission requirement is present. In a case where the CPU 12 makes a negative determination at S67, the CPU 12 may wait for a predetermined length of time before starting to execute S61. This predetermined length of time may be set appropriately as a cycle in which the CPU 12 inquires of the external device 61 about the presence or absence of the transmission requirement. When the CPU 12 has detected the supply stop factor (S67: YES), the CPU 12 ends S35, S28 and executes S29 to end the supply-power control processing.

8. Third Update Processing

Next, the third update processing will be explained. In the second update processing described above, the printer 1 as the power source inquires of the external device 61 as the power sink about the presence or absence of the transmission requirement of the information. In the third update processing, the external device 61 transmits the transmission requirement of the information to the printer 1.

Figure 8:
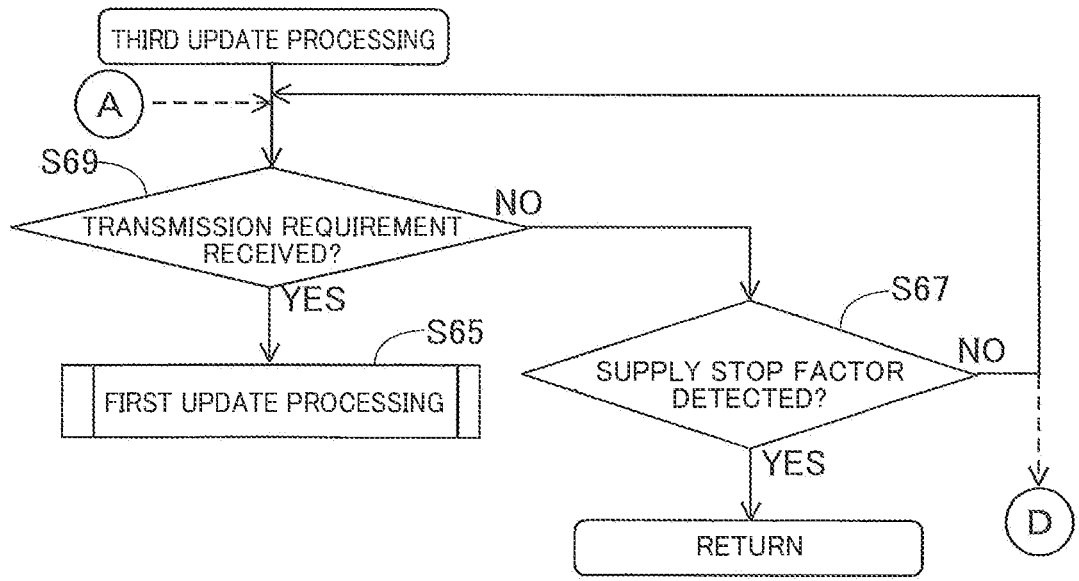
FIG. 8 is a flowchart indicating a third update processing.

FIG. 8 indicates details of the third update processing. In the following explanation, the same reference numerals as used in the second update processing are used to identify the same configurations in the third update processing, and a detailed explanation thereof is dispensed with. As illustrated in FIG. 8, when the CPU 12 executes S35 in FIG. 5 to start the third update processing, the CPU 12 then determines whether the transmission requirement of the information has been received from the external device 61 (S69). For example, the printer 1 is configured to receive the transmission requirement from the external device 61 through the USB communication utilizing the D signal line (D+/D− signal line). In other words, the external device 61 can transmit the transmission requirement through the USB communication at a timing desired by itself. The communication protocol such as the data format of the messages transmitted and received through the USB communication is not limited to a particular one. For example, there may be used a communication protocol specified by a vendor of the printer 1 or the external device 61.

When the CPU 12 receives the transmission requirement from the external device 61 through the USB communication (S69: YES), the CPU 12 executes the first update processing at S65. In a case where the CPU 12 executes the first update processing at S65 in FIG. 8 as in the second update processing, the CPU 12 executes S69 after having executed S49 without executing S51 in FIG. 6. (See dashed arrows and "A" in FIGS. 6 and 8.) With this configuration, the CPU 12 determines at S69 in FIG. 8 whether the transmission requirement has been received. When the CPU 12 receives the transmission requirement (S69: YES), the CPU 12 executes the first update processing only once, namely, the CPU 12 executes S41-S49 only once. In a case where the CPU 12 executes S53 in FIG. 6, i.e., in the case of mismatching, the CPU 12 may end the third update processing. At S65 of the third update processing, the CPU 12 may execute the first update processing whose details are the same as those of FIG. 6. In this case, the CPU 12 determines whether the transmission requirement has been received only once before executing the first update processing.

When the CPU 12 has not received the transmission requirement from the external device 61 at S69 in FIG. 8 (S69: NO), the CPU executes S67. With this configuration, the external device 61 can notify the printer 1 of the transmission requirement at a necessary timing in accordance with the power state of the external device 61.

In the explanation above, the first through third update processings are executed individually. The first through third update processings may be executed in combination. For example, in a case where the CPU 12 makes a negative determination at S51 in the first update processing of FIG. 6 (S51: NO), the CPU 12 may start the second update processing (S61) in FIG. 7 or the third update processing (S69) in FIG. 8.

9. Second Supply Processing

Figure 9:
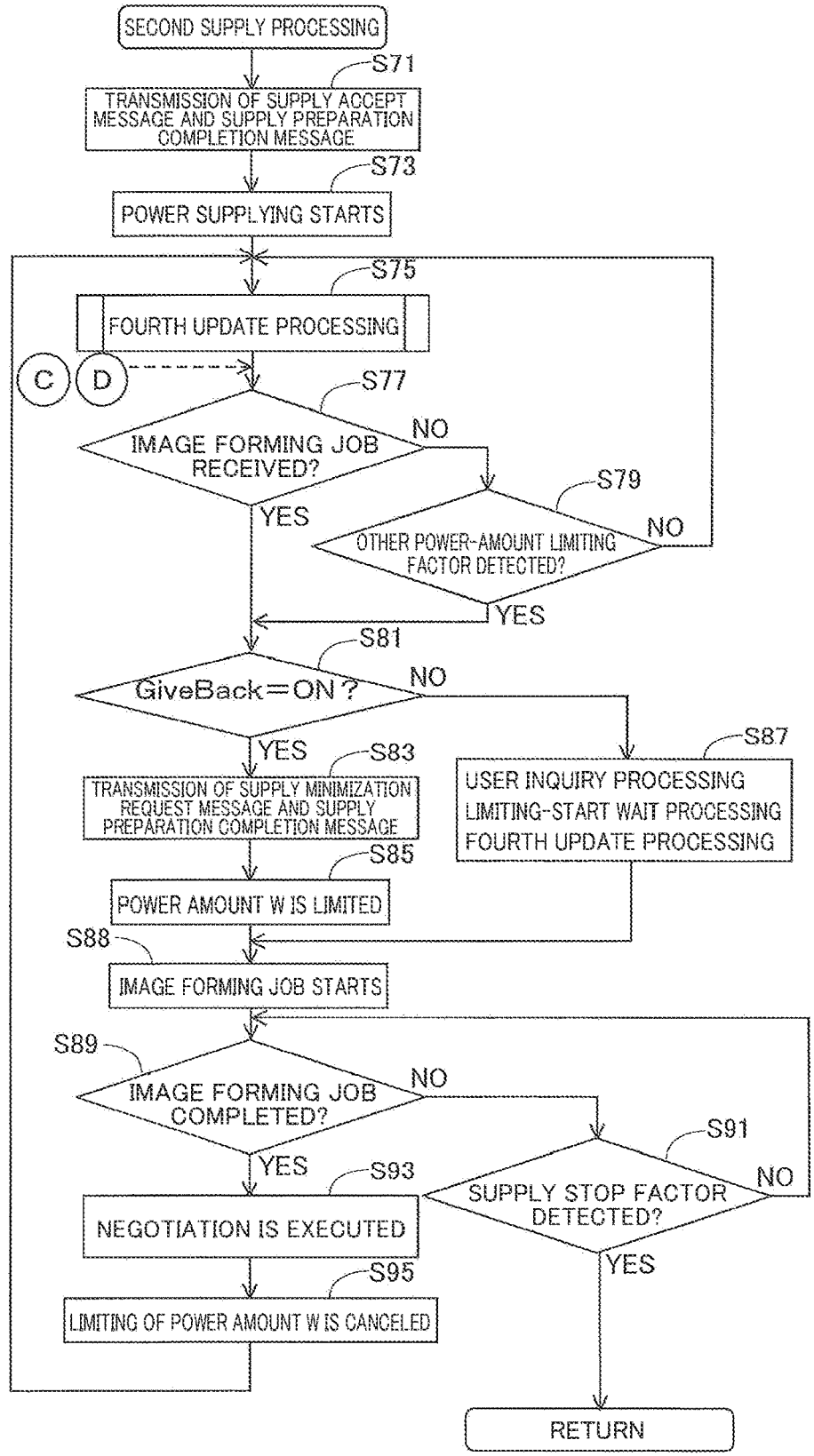
FIG. 9 is a flowchart indicating a second supply processing.

Next, the second supply processing will be explained. FIG. 9 indicates details of the second supply processing. In the second supply processing, when the printer 1 receives the image forming job JOB during supplying the electric power, the printer 1 limits the power amount W based on the information on the GiveBack attribute flag and the minimum operating current value.

As illustrated in FIG. 9, when the CPU 12 starts the second supply processing, the CPU 12 transmits the supply accept message and the supply preparation completion message to the external device 61 (S71) and starts supplying the electric power to the external device 61 (S73). When the CPU 12 starts supplying the electric power at S73, the CPU 12 then starts the fourth update processing (S75).

10. Fourth Update Processing

Next, the fourth update processing will be explained. The details of the fourth update processing are equal to those of the first update processing of FIG. 6 from which S51 is omitted. In the following explanation, the fourth update processing will be explained referring to FIG. 6. In the following explanation, the same reference numerals as used in the first update processing are used to identify the same configurations in the fourth update processing, and a detailed explanation thereof is dispensed with.

When the CPU 12 starts the fourth update processing, the CPU 12 transmits the supply capability message to the external device 61 (S41). The CPU 12 executes the determination processing of S43 until the CPU 12 receives the supply request message from the external device 61. When the CPU 12 receives the supply request message (S43: YES), the CPU 12 confirms the Mismatch flag (S45). When the Mismatch flag is OFF (S45: YES), the CPU 12 transmits the supply accept message and the supply preparation completion message (S47) to start supplying the electric power (S49). When the CPU 12 executes S49, the CPU 12 ends the fourth update processing and executes S77 in FIG. 9 as later explained, without executing S51. (See dashed arrows and "C" in FIGS. 6 and 9.) This configuration enables the CPU 12 to update the information on the GiveBack attribute flag and the minimum operating current value during supplying the electric power.

On the other hand, when the Mismatch flag is ON (S45: NO), the CPU 12 transmits the supply reject message (S53) and ends the fourth update processing. In this case, the CPU 12 ends S35 in FIG. 5 and S28 in FIG. 4 and then executes S29. (See dashed arrows and "B" in FIGS. 4 and 6.) With this configuration, in the case of mismatching after having updated the information, the CPU 12 can stop supplying the electric power and can end the supply-power control processing.

11. Fifth Update Processing

The details of the fourth update processing explained above are one example. As in the second update processing of FIG. 7, before executing the fourth update processing, the CPU 12 may inquire of the external device 61, through the USB communication, whether the transmission requirement of the information is present, and may execute a processing of executing the fourth update processing (hereinafter referred to as "fifth update processing") based on the result of the inquiry.

Referring to FIG. 7, when the CPU 12 executes S75 in FIG. 9 to start the fifth update processing, the CPU 12 inquires of the external device 61 whether the external device is requiring transmission of the information on the GiveBack attribute flag and the minimum operating current value through the USB communication utilizing the D signal line (S61). When the CPU 12 determines that the external device 61 is requiring transmission of the information (S63: YES), the CPU 12 executes the fourth update processing. In a case where the CPU 12 executes the fourth update processing at S65 in FIG. 7, namely, in a case where the fourth update processing is called up from the fifth update processing, the CPU 12 executes S77 in FIG. 9 after having executed S49 without executing S51 in FIG. 6. (See dashed arrows and "C" in FIGS. 6 and 9.) With this configuration, the CPU 12 makes the inquiry at S61 in FIG. 7 and checks the result of the inquiry at S63 in FIG. 7. When the transmission requirement is present (S63: YES), the CPU 12 executes the fourth update processing only once, namely, the CPU 12 executes S41-S49 only once.

Thus, when executing the fifth update processing, the CPU 12 inquires of the external device 61 whether the external device 61 is requiring transmission of the information on the GiveBack attribute flag through data communication compliant with the USB standard, and executes the fourth update processing based on the result of the inquiry. This configuration reduces the number of times of transmission/reception of data such as the supply capability message through the USB PD communication.

When the CPU 12 makes a negative determination at S63 (S63: NO), the CPU 12 determines whether the supply stop factor has been detected (S67). When the supply stop factor has not been detected (S67: NO), the CPU 12 executes the processing at and after S77 in FIG. 9 as later explained. (See dashed arrows and "D" in FIGS. 7 and 9.) Thus, in a case where the transmission requirement is absent, the CPU 12 executes the processings at and after S77 without updating the information. When the CPU 12 makes a negative determination at S63, the CPU 12 may execute S77 without executing S67.

12. Sixth Update Processing

As in the third update processing illustrated in FIG. 8, before executing the fourth update processing, the CPU 12 may determine whether the transmission requirement has been received from the external device 61, and may execute a processing of executing the fourth update processing (hereinafter referred to as "sixth update processing") based on the result of the determination.

Referring to FIG. 8, when the CPU 12 executes S75 in FIG. 9 to start the sixth update processing, the CPU 12 determines whether the transmission requirement has been received from the external device 61 (S69). When the CPU 12 receives the transmission requirement from the external device 61 through the USB communication utilizing the D signal line (S69: YES), for example, the CPU 12 executes the fourth update processing explained above. In a case where the CPU 12 executes the sixth update processing at S65 in FIG. 8, for example, the CPU 12 executes the processing at S77 in FIG. 9 after having executed S49 without executing S51 in FIG. 6. (See dashed arrows and "C" in FIGS. 6 and 9.) With this configuration, the CPU 12 determines at S69 in FIG. 8 whether the transmission requirement has been received. When the transmission requirement is present (S69: YES), the CPU 12 executes the fourth update processing only once, namely, the CPU 12 executes S41-S49 only once.

When the CPU 12 does not receive the transmission requirement from the external device 61 (S69: NO), the CPU 12 determines whether the supply stop factor has been detected (S67). When the supply stop factor has not been detected (S67: NO), the CPU 12 executes the processings at and after S77 in FIG. 9. (See dashed arrows and "D" in FIGS. 8 and 9.) Thus, in a case where the transmission requirement is not received, the CPU 12 executes the processings at and after S77 without updating the information. The external device 61 can transmit the transmission requirement to the printer 1 at a necessary timing in accordance with a change of the power state of the external device 61. When the CPU 12 makes a negative determination at S69, the CPU 12 may execute S77 without executing S67.

In the explanation above, the fourth through sixth update processings are executed individually. The fourth through sixth update processings may be executed in combination. For example, the CPU 12 may switchably execute the fourth update processing, the fifth update processing, and the sixth update processing every time when the processing of S75 in FIG. 9 starts.

Returning back to FIG. 9, when the CPU 12 executes the fourth update processing at S75, the CPU 12 determines whether the image forming job JOB has been received (S77). The CPU 12 determines that the image forming job JOB has been received (S77: YES) when the CPU 12 receives, from the PC 63 (FIG. 1), the print job instructing the image forming device 16 to perform printing based on the image data, for example. The CPU 12 determines that the image forming job JOB has been received (S77: YES) when the CPU 12 receives execution of copying or scanning based on the operation input to the user interface 20, for example. When the CPU 12 makes an affirmative determination at S77, the CPU 12 executes S81.

When the CPU 12 does not receive the image forming job JOB (S77: NO), the CPU 12 determines whether other power-amount limiting factor has been detected (S79). In a case where the image forming job JOB is executed, the power consumption amount of the printer 1 increases and the maximum power amount suppliable from the USB connector 19 accordingly decreases. This arises a need for limiting the power amount W. Further, there are other power-amount limiting factors for the printer 1 to limit the power amount W in addition to the execution of the image forming job JOB.

For example, in a case where a power failure occurs and the printer 1 cannot receive the electric power via the power cord 28, the power amount W needs to be limited. Further, in a case where the power consumption amount temporarily increases by performing the calibration operation for correcting the image quality or the cooling-down operation for releasing heat in the printer 1, the power amount W needs to be limited. The CPU 12 determines at S79 whether such a power-amount limiting factor other than the image forming job JOB has been generated.

When other power-amount limiting factor has not been detected (S79: NO), the CPU 12 executes the processings at and after S75 and updates the information on the GiveBack attribute flag by executing the fourth update processing (S75). In a case where the CPU 12 makes a negative determination at S79 (S79: NO), the CPU 12 may wait for a predetermined length of time before starting the processing of S75. This predetermined length of time may be set appropriately as a cycle in which the CPU 12 inquires of the external device 61 about the information updating.

When other power-amount limiting factor has been detected (S79: YES), the CPU 12 executes S81. At S81, the CPU 12 determines whether the GiveBack attribute flag is ON. By executing S75, the GiveBack attribute flag is updated even during supplying the electric power.

When the GiveBack attribute flag is ON (S81: YES), the CPU 12 transmits the supply minimization request message and the supply preparation completion message (FIG. 2) to the external device 61 to which the electric power is being supplied (S83). Thus, the external device 61 is notified that the limiting of the power amount W is to be executed from now on.

After having executed S83, the CPU 12 limits the power amount W (S85). For example, the CPU 12 controls the power source 27 so as to execute a processing for reducing the power amount W. For example, the CPU 12 determines the power amount W (the supply voltage Vs, the supply current As) that satisfies the minimum operating current value, namely, the power amount W whose current values is not lower than the minimum operating current value, based on the power list and the minimum operating current value. The CPU 12 causes the power source 27 to generate the determined power amount W to supply the generated power amount W to the external device 61 (S85). By executing S75, the minimum operating current value is updated even during supplying the electric power. With this configuration, the external device 61 can receive the electric power in the required power amount W even when the power amount W is being limited.

By starting liming the power amount W at S85, the CPU 12 secures electric power for executing the image forming job JOB. When the CPU 12 executes S85, the CPU 12 then starts executing the image forming job JOB received at S77 (S88). In this respect, the CPU 12 may start executing the image forming job JOB before starting limiting the power amount W or may execute, in parallel, the starting process for limiting the power amount W and the starting process of the image forming job JOB.

When the CPU 12 executes S88, the CPU 12 then determines whether the image forming job JOB is completed (S89). When the image forming job JOB is not completed (S89: NO), the CPU 12 determines whether the supply stop factor has been detected (S91), as at S51 in FIG. 6. When the supply stop factor has not been detected (S91: NO), the CPU 12 again executes the processing of S89. This configuration enables execution of the image forming job JOB in a state in which the power amount W is limited and the electric power is secured. When the supply stop factor has been detected (S91: YES), the CPU 12 ends the second supply processing illustrated in FIG. 9, stops supplying the electric power (S29 in FIG. 4) to end the supply-power control processing.

When the CPU 12 makes a negative determination at S77 and makes an affirmative determination at S79, namely, when the CPU 12 limits the power amount W due to other power-amount limiting factor, the CPU may start the calibration operation at S88. Thus, the power amount W is limited, and the electric power can be secured for enabling the calibration operation or the like to be performed. The CPU 12 may determine at S89 whether the power-amount limiting factor such as the calibration operation has been removed. When the power-amount limiting factor has been removed, the CPU 12 executes S93 that will be later explained. When the power-amount limiting factor is not removed even if a predetermined time elapses (due to a power failure for a long time, for example), the CPU 12 may end the supply-power control processing.

When the CPU 12 determines at S89 that the image forming job JOB is completed (S89: YES), the CPU 12 executes a negotiation with the external device 61 (S93). The negotiation is a processing in which the power list is transmitted and received between the printer 1 and the external device 61 to determine how power supplying is to be executed after cancellation of the limiting of the power amount W. The CPU 12 transmits/receives the supply capability message, the supply request message, the supply accept message, and the supply preparation completion message, so as to execute the negotiation.

When the negotiation at S93 is completed, the CPU 12 cancels the limiting of the power amount W (S95). The CPU 12 controls the power source 27 to supply, to the external device 61, the electric power of the power amount W determined in the negotiation at S93. It is thus possible to restart supplying the electric power desired by the external device 61.

When the CPU 12 executes S95, the CPU again executes the processings at and after S75. Thus, the printer 1 according to the present embodiment supplies the electric power while updating the information on the GiveBack attribute flag, etc., and limits the power amount W based on the updated information when the image forming job JOB is executed.

The CPU 12 may execute the fourth update processing of S75 after S77 and S79. For example, in a case where the CPU 12 executes S77 after having executed S73 and makes a negative determination at S79 (S79: NO), the CPU 12 may execute S75 and subsequently execute S77. In this case, when the image forming job JOB or the like occurs before the fourth update processing (S75) is executed for the first time, the power amount W is limited based on the information on the GiveBack attribute flag before updating (as one example of first change acceptable or non-acceptable information of the present disclosure). In a case where the CPU 12 cannot update, in the fourth update processing at S75, the information on the GiveBack attribute flag, etc., due to a communication error or the like, the CPU 12 may limit the power amount W based on the information before updating.

When the GiveBack attribute flag is OFF at S81 (S81: NO), the CPU 12 executes S87. In a state in which the GiveBack attribute flag is OFF, changing the power amount W is not accepted by the external device 61. Even in the state in which the GiveBack attribute flag is OFF, the CPU 12 according to the present embodiment limits the power amount W after having executed at least one of predetermined processings described below.

Figure 10:
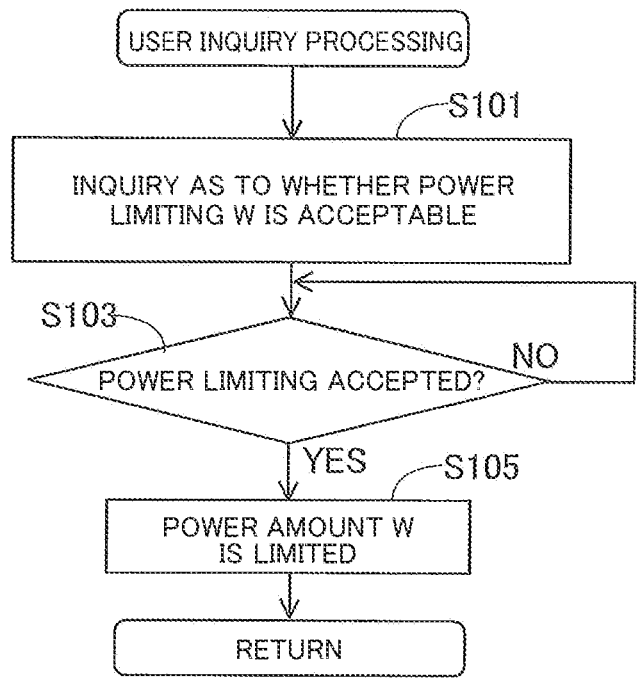
FIG. 10 is a flowchart indicating a user inquiry processing.

At S87, the CPU 12 executes at least one of a user inquiry processing, a limiting-start wait processing, and the fourth update processing. FIG. 10 indicates details of the user inquiry processing. As illustrated in FIG. 10, when the CPU 12 starts the user inquiry processing, the CPU 12 inquires of a user whether execution of the limiting of the power amount W is acceptable (S101). The way to inquire whether the limiting of the power amount W is acceptable is not limited to a particular one. For example, the CPU 12 displays, on the touch panel of the user interface 20, an accept button and a message saying that "The print job is received but the electric power is insufficient. Do you accept changing the power amount W currently being supplied to the external device 61? The external device 61 does not accept changing the power amount W".

When the CPU 12 executes S101, the CPU 12 then determines whether the limiting of the power amount W has been accepted (S103). When the CPU 12 detects that the accept button displayed on the touch panel has been touched, for example, the CPU 12 makes an affirmative determination (S103: YES). After having made an affirmative determination (S103: YES), the CPU 12 executes S105.

The CPU 12 repeatedly executes the determination processing of S103 until the limiting of the power amount W is accepted (S103: NO). In a case where the CPU 12 does not obtain a user's acceptance, the CPU 12 may execute an error processing or the like. For example, the CPU 12 may display at S101 a reject button in addition to the accept button. In this case, when the CPU 12 detects that the reject button has been touched, the CPU 12 may display, on the touch panel of the user interface 20, a message asking whether it is acceptable to delete the image forming job JOB received at S77. The CPU 12 may notify an error to the device that has transmitted the image forming job JOB. The CPU 12 may execute the power-amount limiting processing at S105 in a case where no instruction, such as acceptance or reject, is received from the user even after a predetermined length of time has elapsed.

At S105, the CPU 12 limits the power amount W. When the CPU 12 executes S105, the CPU 12 ends the processing illustrated in FIG. 10, and starts executing the image forming job JOB at S88 in FIG. 9. With this configuration, when the CPU 12 obtains user's acceptance even if the GiveBack attribute flag is OFF, the CPU 12 forcibly limits the power amount W to secure the electric power. It is thus possible to secure the electric power necessary for executing the image forming job JOB.

The way to limit the power amount W at S105 is not limited to a particular one. For example, in a case where the CPU 12 has previously received, from the external device 61, the supply request message in which the setting of the GiveBack attribute flag is ON and the minimum operating current value is set, the CPU 12 may determine the power amount W to be limited, based on the minimum operating current value. The CPU 12 may limit the power amount W to a level equal to a minimum electric power (e.g., 10 W or 2.5 W) suppliable by the printer 1 via the USB connector 19.

The CPU 12 may reduce the power amount W to zero so as to completely stop supplying.

Figure 11:
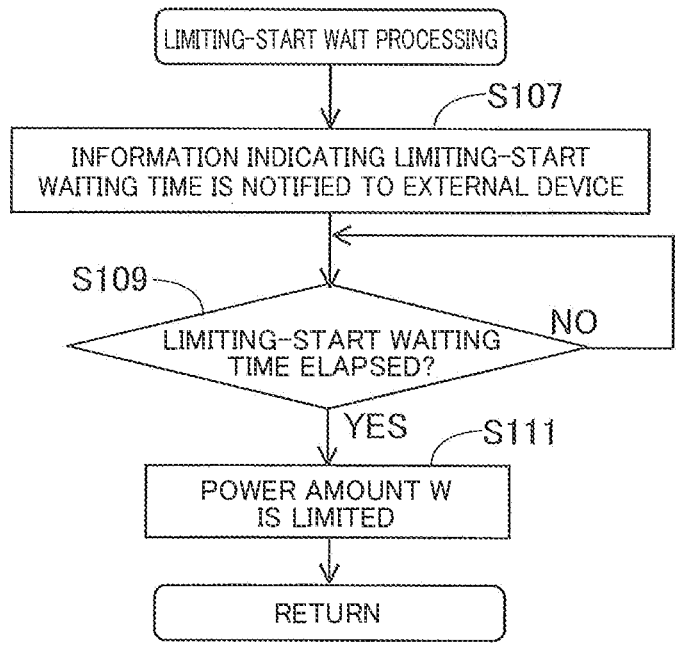
FIG. 11 is a flowchart indicating a limiting-start wait processing.

FIG. 11 indicates details of the limiting-start wait processing. As illustrated in FIG. 11, when the CPU 12 starts the limiting-start wait processing, the CPU 12 notifies to the external device 61 of information indicating a limiting-start waiting time (S107). The limiting-start waiting time is, for example, a length of time from a time point of notifying the information indicating the liming-start waiting time to the external device 61 to a time point of starting the control to limit the power amount W. The limiting-start waiting time is a length of time such as several seconds, several milliseconds, etc., for example. The limiting-start waiting time may be a preset fixed value or may be variably set by the CPU 12 in accordance with the type of the external device 61 (such as a USB-device class). The information, indicating the limiting-time waiting time, to be notified to the external device 61 may be a value indicating the length of time of the limiting-start waiting time per se or may be a value indicating a range of the length of time, a variable used for calculating the limiting-start waiting time or the like. The way to notify the limiting-start waiting time to the external device 61 is not limited to a particular one. For example, the CPU 12 may notify the information indicating the limiting-start waiting time to the external device 61 through the communication utilizing the CC signal line or the D signal line.

After having executed S107, the CPU 12 executes S109. At S109, the CPU 12 determines whether the limiting-start waiting time notified at S107 has elapsed. When the limiting-start waiting time has elapsed (S109: YES), the CPU 12 limits the power amount W (S111), as at S105 in FIG. 10. After having executed S111, the CPU 12 executes S88 in FIG. 9. Here, if the power amount W is limited in a state in which the GiveBack attribute flag is OFF, the external device 61 may suffer from a system trouble, an error of its storage device or the like because the power amount W is reduced or the power supplying is stopped. In the present embodiment, in contrast, the limiting of the power amount W is executed after the external device 61 is notified of the limiting-start waiting time, whereby the external device 61 can receive the limiting-start waiting time before the power amount W is limited. Accordingly, the external device 61 can take, in advance, appropriate measures such as a halt of the system, a halt of the storage device, and inhibition of write access to the storage device, thus making it possible to reduce or prevent an occurrence of failures of the external device 61. In other words, the limiting-start waiting time is desirably set, depending upon the kind of the external device 61, as a time that allows the system of the external device 61 to be safely halted.

The CPU 12 may execute the fourth update processing at S87 to inquire of the external device 61 about the information on the GiveBack attribute flag and the minimum operating current value. Accordingly, the CPU 12 may inquire of the external device 61 about the information on the GiveBack attribute flag immediately before limiting the power amount W. For example, in a case where the CPU 12 executes the fourth update processing at S87 and the setting of the GiveBack attribute flag is changed from OFF to ON, the CPU 12 may execute the processings at and after S83. In this configuration, if the external device 61 is in a state, immediately before limiting the power amount W, in which changing the power amount W is acceptable, the power amount W can be appropriately limited by inquiring about the information on the GiveBack attribute flag. In a case where the CPU 12 executes the fourth update processing at S87 and the setting of the GiveBack attribute flag received from the external device 61 is OFF, namely, in a case where the setting of the GiveBack attribute flag remains OFF when the CPU 12 has made the inquiry immediately before the limiting of the power amount W to be executed, the CPU 12 may execute the user inquiry processing (FIG. 10) or the limiting-start wait processing (FIG. 11) and may then limit the power amount W.

In a case where the CPU 12 executes initially the user inquiry processing at S87 and obtains a user's acceptance to limit the power amount W, the CPU 12 may execute the limiting-start wait processing to notify the limiting-start waiting time to the external device 61. This configuration enables execution of both the inquiry to the user and the advanced notification to the external device 61.

The printer 1 is one example of an information processing apparatus. The CPU 12 is one example of a controller. The image forming device 16 and the image reader 17 are one example of an image forming device. The USB connector 19 is one example of an interface. The GiveBack attribute flag is one example of first change acceptable or non-acceptable information and second change acceptable or non-acceptable information. The minimum operating current value is one example of first minimum-power-amount information and second minimum-power-amount information. S23 is one example of a first reception step. S33 is one example of a power supplying step. S43 is one example of a second reception step. S77 and S79 are one example of a power-amount-limiting necessity or unnecessity determining step. S85, S105, and S111 are one example of a power-amount limiting step. S107 is one example of a transmission processing. i.e., transmitting information indicating the limiting-start waiting time to the external device.

13. Effects

The embodiment illustrated above offers the following effects. (1) The CPU 12 of the printer 1 according to the present embodiment executes: the processing of S23 to receive, from the external device 61, the GiveBack attribute flag indicating whether changing of the power amount W to be supplied to the external device 61 via the USB connector 19 is acceptable; and the processings of S33, S73 to supply, after S23, the electric power to the external device 61 via the USB connector 19. The CPU 12 further executes: the first through sixth update processings to receive, during supplying the electric power, the GiveBack attribute flag (one example of second change acceptable or non-acceptable information) indicating whether the changing of the power amount W to be supplied to the external device 61 via the USB connector 19 is acceptable; and the processings of S77 and S79 to determine, during supplying the electric power, whether limiting of the power amount W is necessary. When it is determined in the processings of S77 and S79 to limit the power amount W and any update processing is executed, the CPU 12 executes the processings of S85, S105, and S11 to limit the power amount W based on the updated GiveBack attribute flag. The processing of S23 is one example of a first receiving processing, i.e., receiving the first change acceptable or non-acceptable information from the external device. Each of the processings of S33, S73 is one example of a power supply processing, i.e., supplying the electric power to the external device via the interface. Each of the first through sixth update processings is one example of a second receiving processing, i.e., receiving the second change acceptable or non-acceptable information. Each of the processings of S77 and S79 is one example of a power-amount-limiting necessity or unnecessity determining processing, i.e., determining whether limiting of the power amount to be supplied to the external device is necessary. Each of the processings of S85, S105, and S11 is one example of a power-amount limiting processing, i.e., limiting the power amount to be supplied to the external device.

According to the above configuration, the CPU 12 receives, during the power supplying, the information on the GiveBack attribute flag, in addition to the GiveBack attribute flag received before the power supplying is started, and updates the information on the GiveBack attribute flag. When it is determined to limit the power amount W, the CPU 12 limits the power amount W to be supplied to the external device 61 based on the updated information on the GiveBack attribute flag. With this configuration, the CPU 12 can give the external device 61 an opportunity to update the GiveBack attribute flag. The external device 61 can suitably update the GiveBack attribute flag in accordance with the power state thereof such as a state in which the consumption amount of the electric power thereof is increased, so that an occurrence of a power shortage is prevented or reduced.

(2) At S23, the CPU 12 receives, from the external device 61, the minimum operating current value that is information indicating the power amount W requested by the external device 61. At S43, the CPU 12 receives, from the external device 61, the updated minimum operating current value. At S85, the CPU 12 limits the power amount W based on the updated information on the GiveBack attribute flag and the minimum operating current value.

According to the above configuration, the external device 61 is given an opportunity to update the minimum operating current value, in addition to the GiveBack attribute flag. The external device 61 can suitably update the minimum operating current value in accordance with the power state thereof. It is thus possible to limit the power amount W in accordance with the latest minimum operating current value requested by the external device 61.

(3) At S43, the CPU 12 receives, from the external device 61, the information on the GiveBack attribute flag utilizing the supply capability message and the supply request message defined according to the USB PD standard. With this configuration, the CPU 12 performs transmission/reception of the messages defined according to the USB PD standard with the external device 61, whereby the CPU 12 receives the information on the GiveBack attribute flag and updates the GiveBack attribute flag. The utilization of the messages defined according to the USB PD standard eliminates a need to newly define the communication protocol (such as data format of the messages and the procedure for transmission/reception of the messages) for updating the GiveBack attribute flag.

(4) The CPU 12 may execute, before executing S43, the processing of FIG. 7 or the processing of FIG. 8 (each as one example of a transmission-requirement determining processing, i.e., determining whether the external device is requiring transmission of the second change acceptable or non-acceptable information) to determine whether the external device 61 is requiring transmission of the GiveBack attribute flag. When it is determined in the processing of FIG. 7 or FIG. 8 that the external device 61 is requiring the transmission of the GiveBack attribute flag (S63, S69: YES), the CPU 12 executes S43 (S65).

In a case where the processing of S43 is executed utilizing the supply request message and the like defined according to the USB PD standard, data transmission/reception according to the communication standard occurs every time when the first and fourth update processing are executed. If the inquiry by the supply capability message is repeated even though the external device 61 is not requiring the transmission of the GiveBack attribute flag, the processing load may undesirably increase. In contrast, the CPU 12 inquires, before executing the first and fourth update processings (S43), whether the external device 61 is requiring the transmission. With this configuration, the CPU 12 executes the first and fourth update processings only when the external device 61 desires the transmission, thus decreasing the processing load relating to the first and fourth update processings.

(5) In the second update processing (or the fifth update processing) illustrated in FIG. 7, the CPU 12 inquires, through data communication compliant with the USB (Universal Serial Bus) standard, whether the external device 61 is requiring the transmission of the GiveBack attribute flag (S61), and determines whether the external device 61 is requiring the transmission of the GiveBack attribute flag based on the result of the inquiry (S63).

With the above configuration, the CPU 12 can confirm whether the external device 61 is requiring the transmission by making inquiry to the external device 61 through the USB communication. Further, by waiting for the inquiry from the printer 1, it is not necessary for the external device 61 to notify the transmission requirement to the printer 1, resulting in a decrease in the processing load.

(6) In a case where the CPU 12 receives, through the data communication compliant with the USB standard, the transmission requirement of the GiveBack attribute flag from the external device 61 in the third update processing (or the sixth update processing) illustrated in FIG. 8 (S69: YES), the CPU 12 determines that the external device 61 is requiring the transmission of the GiveBack attribute flag. With this configuration, when the external device 61 desires to update the information on the GiveBack attribute flag in accordance with the power state thereof by transmission of the GiveBack attribute flag, the external device 61 can suitably transmit the transmission requirement to the printer 1.

(7) When the CPU 12 determines to limit the power amount W (S77: YES, S79: YES), the CPU 12 may execute, before limiting the power amount W, the fourth update processing (S87 in FIG. 9). With this configuration, the fourth update processing is executed before limiting the power amount W, so that it is possible to confirm the information on the GiveBack attribute flag immediately before limiting the power amount W. Thus, the power amount W can be limited after having confirmed the latest information on the GiveBack attribute flag of the external device 61.

(8) When the CPU 12 determines to limit the power amount W (S77: YES, S79: YES), the CPU 12 may execute at S87 the processing of S107 in FIG. 11 (as one example of a transmitting processing, i.e., transmission) to transmit, to the external device 61, the limiting-start waiting time that is a length of time before starting limiting the power amount W. The CPU 12 may execute the limiting of the power amount W based on a lapse of the limiting-start waiting time (S109: YES).

According to the above configuration, the power amount W can be limited after giving the external device 61 a predetermined time, i.e., the limiting-start waiting time. This enables the external device 61 to take appropriate measures, within the limiting-start waiting time, such as securing of a power source and safe halting of the external device 61. It is thus possible to prevent or reduce an occurrence of failures of the external device 61 due to abrupt limiting of the power amount W.

(9) The printer 1 includes the image forming device 16 configured to form an image and the image reader 17. (The image forming device 16 and the image reader 17 are one example of the image forming device). When the image forming device 16 etc., executes image formation (S77: YES), the CPU 12 determines to limit the power amount W.

When image formation is executed by the image forming device in the information processing apparatus equipped with the image forming device such as the printer and the scanner, power consumption increases, thus requiring more electric power. Accordingly, the power amount W is limited when image formation is executed by the image forming device, so that the electric power necessary for image formation can be secured.

(10) When the CPU 12 determines to limit the power amount W and does not execute the update processing during supplying the electric power, the CPU 12 may limit the power amount W based on the GiveBack attribute flag before updating. For example, in a case where the printer 1 is placed, before executing the update processing of S35 or S75, in a situation in which the power consumption amount increases due to an occurrence of a power failure, shifting to a mode in which the power consumption amount is large, execution of the image-quality calibration operation, reception of the image forming job JOB, etc., the CPU 12 may limit the power amount W based on the GiveBack attribute flag and the minimum operating current value received at S23 (received before supplying).

The above configuration enables the power amount W to be limited based on the GiveBack attribute flag before updating in a case where the update processing is not executed and the GiveBack attribute flag cannot be updated, due to some cause.

(11) When the CPU 12 limits the power amount W without executing the update processing, the CPU 12 may limit the power amount W based on the minimum operating current value before updating. This configuration enables determination of the power amount W to be limited based on the minimum operating current value before updating in a case where the update processing is not executed and the minimum operating current value cannot be updated due to some cause.

14. Modifications

It is to be understood that the present disclosure is not limited to the details of the illustrated embodiment, but may be embodied with various changes and modifications, which may occur to those skilled in the art without departing from the spirit and the scope of the present disclosure.

In the illustrated embodiment, the control illustrated in FIGS. 3-11 is executed by the CPU 12. The control may be executed by other device. For example, the power controller 25 may execute the control illustrated in FIGS. 3-11 by executing the program PG stored in the memory 26. In this instance, the power controller 25 is one example of the controller in the present disclosure. The program PG is one example of the program in the present disclosure.

In the illustrated embodiment, the printer 1 includes the power saving mode in which the power consumption amount is reduced. The printer 1 need not necessarily include the power saving mode.

The limiting of the power amount in the present disclosure is a concept including not only merely reducing the power amount but also reducing the power amount to zero.

The processing details and the processing order in the flowcharts illustrated in FIGS. 3-11 are one example. For example, in a case where the CPU 12 makes a negative determination at S77 (S77: NO), the CPU may execute S75 without executing S79 in FIG. 9. Thus, the CPU 12 may determine only reception of the image forming job JOB without making a determination as to other power-amount limiting factor.

In the update processing of S35, the CPU 12 updates both the GiveBack attribute flag and the minimum operating current value. The CPU 12 may update only one of the GiveBack attribute flag and the minimum operating current value.

In the second supply processing of FIG. 9, the CPU 12 may execute the fourth update processing at S87 without executing S75. With this configuration, the CPU 12 does not regularly update the information during supplying the electric power. Instead, the CPU 12 executes the fourth update processing to update the GiveBack attribute flag, etc., only when the power amount W needs to be limited (S77: YES, S79: YES).

In the second supply processing of FIG. 9, the CPU 12 may execute the limiting-start wait processing at S87 without executing S75. In this configuration, the CPU 12 does not update the information on the GiveBack attribute flag after having started supplying the electric power, but the CPU 12 can give the limiting-start waiting time to the external device 61 before actually limiting the power amount W.

In a case where the GiveBack attribute flag is ON at S81, the CPU 12 may execute notification of the limiting-start waiting time to the external device 61 and determination as to a lapse of the limiting-start waiting time. In this case, after the limiting-start waiting time has elapsed, the CPU 12 may execute the processings at and after S83. This configuration enables the CPU 12 to notify to the external device 61 of the limiting-start waiting time even in a state in which the external device 61 accepts changing the power amount W.

In the illustrated embodiment, the CPU 12 executes, for one external device 61, the control illustrated in FIGS. 3-11, the updating of the information on the GiveBack attribute flag, the limiting of the power amount W, etc. The CPU 12 may execute, for a plurality of the external devices 61, the updating of the information on the GiveBack attribute flag and the limiting of the power amount W based on the updated information.

The communication standard of the interface in the present disclosure is not limited to that according to the USB PD standard but may be any other communication standard according to which the power transmission/reception is executable. Thus, the first change acceptable or non-acceptable information and the second change acceptable or non-acceptable information are not limited to the GiveBack attribute flag but may be information defined according to various communication standards. Likewise, the first minimum-power-amount information and the second minimum-power-amount information are not limited to the minimum operating current value.

While the CPU 12 is employed as the controller according to the present disclosure, the present disclosure is not limited to this configuration. For example, at least a part of the controller may be specific hardware such as an ASIC (Application Specific Integrated Circuit). The controller may be operated by a combination of software processing and hardware processing.

The power source 27 may be configured not to include the battery 31.

In the illustrated embodiment, the portable printer 1 is employed as the information processing apparatus of the present disclosure. The present disclosure is not limited to this configuration. The information processing apparatus of the present disclosure may be a non-portable stationary printer. The information processing apparatus of the present disclosure is not limited to the printer but may be any of a copying machine, a facsimile machine, and a scanning machine. The information processing apparatus of the present disclosure may be a multi-function peripheral (MFP) having a plurality of functions. The information processing apparatus of the present disclosure may include a facsimile (FAX) communication device configured to perform transmission/reception of FAX data with other facsimile device via a telephone line. The information processing apparatus of the present disclosure is not limited to the one equipped with the image forming device 16 and the image reader 17. For example, there may be employable, as the information processing apparatus, various electronic devices (such as a camera and a sewing machine) including an interface capable of supplying electric power.

What is claimed is:

1. An information processing apparatus, comprising:
an interface; and
a controller,
wherein the controller is configured to:
receive, from an external device, first change acceptable or non-acceptable information indicating whether changing of a power amount to be supplied to the external device via the interface is acceptable, the power amount being an amount of electric power to be supplied to the external device;
supply, after the receiving the first change acceptable or non-acceptable information from the external device, the electric power to the external device via the interface;
receive, during executing the supplying the electric power to the external device via the interface, second change acceptable or non-acceptable information indicating whether the changing of the power amount to be supplied to the external device via the interface is acceptable;
determine, during executing the supplying the electric power to the external device via the interface, whether limiting of the power amount to be supplied to the external device is necessary; and
limit, based on the second change acceptable or non-acceptable information, the power amount to be supplied to the external device when the controller determines to limit the power amount to be supplied to the external device in the determining whether limiting of the power amount to be supplied to the external device is necessary and the receiving the second change acceptable or non-acceptable information is executed.

2. The information processing apparatus according to claim 1,
wherein, in the receiving the first change acceptable or non-acceptable information from the external device, the controller receives, from the external device via the interface, first minimum-power-amount information indicating an amount of the electric power requested by the external device:
wherein, in the receiving the second change acceptable or non-acceptable information, the controller receives, from the external device via the interface, second minimum-power-amount information indicating the amount of the electric power requested by the external device; and
wherein, in the limiting the power amount to be supplied to the external device, the controller limits the power amount to be supplied to the external device based on the second change acceptable or non-acceptable information and the second minimum-power-amount information.

3. The information processing apparatus according to claim 1, wherein, in the receiving the second change acceptable or non-acceptable information, the controller receives the second change acceptable or non-acceptable information from the external device utilizing a message defined according to a USB PD (USB Power Delivery) standard.

4. The information processing apparatus according to claim 1,
wherein, before executing the receiving the second change acceptable or non-acceptable information, the controller determines whether the external device is requiring transmission of the second change acceptable or non-acceptable information; and
wherein the controller executes the receiving the second change acceptable or non-acceptable information when the controller determines, in the determining whether the external device is requiring transmission of the second change acceptable or non-acceptable information, that the external device is requiring the transmission of the second change acceptable or non-acceptable information.

5. The information processing apparatus according to claim 4, wherein, in the determining whether the external device is requiring transmission of the second change acceptable or non-acceptable information, the controller i) inquires, through data communication compliant with a USB (Universal Serial Bus) standard, whether the external device is requiring the transmission of the second change acceptable or non-acceptable information and ii) determine, based on a result of the inquiry, whether the external device is requiring the transmission of the second change acceptable or non-acceptable information.

6. The information processing apparatus according to claim 4, wherein, when the controller receives a transmission requirement of the second change acceptable or non-acceptable information from the external device through data communication compliant with a USB (Universal Serial Bus) standard, the controller determines, in the determining whether the external device is requiring transmission of the second change acceptable or non-acceptable information, that the external device is requiring the transmission of the second change acceptable or non-acceptable information.

7. The information processing apparatus according to claim 1, wherein, when the controller determines to limit the power amount to be supplied to the external device in the determining whether limiting of the power amount to be supplied to the external device is necessary, the controller executes the receiving the second change acceptable or non-acceptable information before executing the limiting the power amount to be supplied to the external device.

8. The information processing apparatus according to claim 1,
wherein, when the controller determines to limit the power amount to be supplied to the external device in the determining whether limiting of the power amount to be supplied to the external device is necessary, the controller transmits, to the external device, information indicating a limiting-start waiting time that is a length of time before starting limiting the power amount to be supplied to the external device; and
wherein the controller executes the limiting the power amount to be supplied to the external device based on a lapse of the limiting-start waiting time.

9. The information processing apparatus according to claim 1, further comprising an image forming device configured to form an image,
wherein, when image formation by the image forming device is executed, the controller determines to limit the power amount to be supplied to the external device in the determining whether limiting of the power amount to be supplied to the external device is necessary.

10. The information processing apparatus according to claim 1, wherein, in the limiting the power amount to be supplied to the external device, the controller limits the power amount to be supplied to the external device based on the first change acceptable or non-acceptable information when the controller determines to limit the power amount to be supplied to the external device in the determining whether limiting of the power amount to be supplied to the external device is necessary and the receiving the second change acceptable or non-acceptable information is not executed during executing the supplying the electric power to the external device via the interface.

11. The information processing apparatus according to claim 1,
wherein, in the receiving the first change acceptable or non-acceptable information from the external device, the controller receives first minimum-power-amount information indicating an amount of the electric power requested by the external device, from the external device via the interface;
wherein, in the receiving the second change acceptable or non-acceptable information, the controller receives second minimum-power-amount information indicating the amount of the electric power requested by the external device, from the external device via the interface; and
wherein, in the limiting the power amount to be supplied to the external device, the controller limits the power amount to be supplied to the external device based on the first change acceptable or non-acceptable information and the first minimum-power-amount information when the receiving the second change acceptable or non-acceptable information is not executed.

12. An information processing apparatus, comprising:
an interface; and
a controller,
wherein the controller is configured to:
receive, from an external device, first change acceptable or non-acceptable information indicating whether changing of a power amount to be supplied to the external device via the interface is acceptable, the power amount being an amount of electric power to be supplied to the external device;
supply, after the receiving the first change acceptable or non-acceptable information from the external device, the electric power to the external device via the interface;
determine, during executing the supplying the electric power to the external device via the interface, whether limiting of the power amount to be supplied to the external device is necessary;
receive second change acceptable or non-acceptable information indicating whether the changing of the power amount to be supplied to the external device via the interface is acceptable when the controller determines to limit the power amount to be supplied to the external device in the determining whether limiting of the power amount to be supplied to the external device is necessary; and
limit the power amount to be supplied to the external device based on the second change acceptable or non-acceptable information received in the receiving the second change acceptable or non-acceptable information.

13. An information processing apparatus, comprising:
an interface; and
a controller,
wherein the controller is configured to:
supply electric power to an external device via the interface;
determine, during executing the supplying the electric power to the external device via the interface, whether limiting of a power amount to be supplied to the external device is necessary, the power amount being an amount of the electric power to be supplied to the external device;
transmit, to the external device, information indicating a limiting-start waiting time when the controller determines to limit the power amount to be supplied to the external device in the determining whether limiting of the power amount to be supplied to the external device is necessary, the limiting-start waiting time being a length of time before starting limiting the power amount to be supplied to the external device; and
limit the power amount to be supplied to the external device based on a lapse of the limiting-start waiting time.

14. A method of controlling an information processing apparatus comprising an interface and a controller, the method comprising:
a power supplying step of supplying electric power to an external device via the interface;
a power-amount-limiting necessity or unnecessity determination step of determining, during executing the power supplying step, whether limiting of a power amount to be supplied to the external device is necessary, the power amount being an amount of the electric power to be supplied to the external device;
a transmission step of transmitting, to the external device, information indicating a limiting-start waiting time when the controller determines to limit the power amount to be supplied to the external device in the power-amount-limiting necessity or unnecessity determination step, the limiting-start waiting time being a length of time before starting limiting the power amount to be supplied to the external device; and
a power-amount limiting step of limiting the power amount to be supplied to the external device based on a lapse of the limiting-start waiting time.

15. A non-transitory storage medium storing a program executable by a computer of an information processing apparatus comprising an interface,
wherein, when executed by the computer, the program causes the image forming apparatus to:
receive, from an external device, first change acceptable or non-acceptable information indicating whether changing of a power amount to be supplied to the external device via the interface is acceptable, the power amount being an amount of electric power to be supplied to the external device;

supply, after the receiving the first change acceptable or non-acceptable information from the external device, the electric power to the external device via the interface;

determine, during executing the supplying the electric power to the external device via the interface, whether limiting of the power amount to be supplied to the external device is necessary;

receive second change acceptable or non-acceptable information indicating whether the changing of the power amount to be supplied to the external device via the interface is acceptable when it is determined to limit the power amount to be supplied to the external device in the determining whether limiting of the power amount to be supplied to the external device is necessary; and limit the power amount to be supplied to the external device based on the second change acceptable or non-acceptable information received in the receiving the second change acceptable or non-acceptable information.

* * * * *